(12) United States Patent  (10) Patent No.: US 7,073,330 B1
Hauser  (45) Date of Patent: Jul. 11, 2006

(54) STEERING SYSTEM FOR A HYDROSTATIC DRIVE APPARATUS

(75) Inventor: Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/963,109

(22) Filed: Oct. 12, 2004

Related U.S. Application Data

(60) Provisional application No. 60/511,582, filed on Oct. 15, 2003.

(51) Int. Cl.
*F16D 39/02* (2006.01)

(52) U.S. Cl. ................................................. 60/487

(58) Field of Classification Search ............... 60/484, 60/486, 487, 488
See application file for complete search history.

(56) References Cited

U.S. PATENT DOCUMENTS

| | | | |
|---|---|---|---|
| 3,789,940 A * | 2/1974 | Burton ............... 180/6.48 |
| 3,943,792 A | 3/1976 | Sibeud |
| 4,140,031 A | 2/1979 | Sibeud et al. |
| 4,339,962 A | 7/1982 | Babel |
| 4,493,228 A | 1/1985 | Vokovich et al. |
| 4,567,969 A | 2/1986 | Makita |
| 4,664,217 A | 5/1987 | Welch et al. |
| 4,817,471 A | 4/1989 | Tury |
| 4,841,793 A | 6/1989 | Leigh-Monstevens et al. |
| 4,843,901 A | 7/1989 | Peterson et al. |
| 4,922,769 A | 5/1990 | Tury |
| 4,923,027 A | 5/1990 | Hayashi et al. |
| 4,971,535 A | 11/1990 | Okada et al. |
| 4,980,668 A | 12/1990 | Leigh-Monstevens et al. |
| 5,014,038 A | 5/1991 | Leigh-Monstevens et al. |
| RE34,064 E | 9/1992 | Tury et al. |
| 5,147,010 A | 9/1992 | Olson et al. |
| 5,450,054 A | 9/1995 | Schmersal |
| 5,540,560 A | 7/1996 | Kimura et al. |
| 5,741,202 A | 4/1998 | Huber |
| 5,743,347 A | 4/1998 | Gingerich |
| 5,794,422 A | 8/1998 | Reimers et al. |
| 5,819,537 A | 10/1998 | Okada et al. |
| 5,984,828 A | 11/1999 | Huber |
| 6,016,717 A | 1/2000 | Wheeler |
| 6,082,084 A | 7/2000 | Reimers et al. |
| 6,109,033 A | 8/2000 | Folsom et al. |
| 6,122,996 A | 9/2000 | Hauser et al. |
| 6,145,399 A | 11/2000 | Bockmann et al. |
| 6,167,996 B1 | 1/2001 | Huber et al. |
| 6,295,887 B1 | 10/2001 | DeJong et al. |
| 6,481,203 B1 | 11/2002 | Johnson et al. |
| 6,591,593 B1 | 7/2003 | Brandon et al. |
| 6,604,348 B1 | 8/2003 | Hunt |
| 6,672,058 B1 | 1/2004 | Langenfeld et al. |
| 6,775,976 B1 | 8/2004 | Phanco et al. |
| 6,843,747 B1 | 1/2005 | Phanco et al. |
| 6,964,164 B1 * | 11/2005 | Langenfeld ............... 60/487 |
| 2001/0035014 A1 | 11/2001 | Yano et al. |
| 2002/0002825 A1 | 1/2002 | Takada et al. |
| 2002/0034994 A1 | 3/2002 | Johnson et al. |
| 2003/0136591 A1 | 7/2003 | Kitasaka |
| 2003/0169003 A1 | 9/2003 | Cao et al. |
| 2004/0133331 A1 | 7/2004 | Kuttler et al. |

* cited by examiner

*Primary Examiner*—Thomas E. Lazo
(74) *Attorney, Agent, or Firm*—Neal, Gerber & Eisenberg LLP

(57) ABSTRACT

An electronic steering control system for controlling the lateral movement of a vehicle powered by a pair of hydrostatic drive devices.

23 Claims, 33 Drawing Sheets

STEERING SYSTEM FOR A HYDROSTATIC DRIVE APPARATUS

CROSS REFERENCE TO RELATED APPLICATIONS

This application claims the benefit of U.S. Non-Provisional Patent Application Ser. No. 60/511,582, filed Oct. 15, 2003, which is incorporated herein by reference.

BACKGROUND OF THE INVENTION

This invention relates generally to hydrostatic transaxles.

Hydrostatic transaxles ("HSTs"), including integrated hydrostatic transaxles ("IHTs"), are known in the art and are more fully described in, among others, U.S. Pat. No. 5,314,387, which is incorporated herein by reference in its entirety. Generally, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the degree of axial movement depends upon the angular orientation of the swash plate. Axial movement of the pump pistons forces a hydraulic fluid through the porting, which forces the motor pistons against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor and the rotation of the hydraulic motor may be used to drive one or more axles of a riding lawn mower, small tractor, or the like.

Zero-turn, hydrostatic transaxles (HZTs) are also known in the art. Generally, an HZT is utilized in connection with a vehicle to provide for the independent control of each of the drive wheels of the vehicle. By way of example, HZTs are described in U.S. Pat. No. 5,078,222, which is incorporated herein by reference in its entirety.

SUMMARY OF THE INVENTION

A steering mechanism for a pair of hydrostatic devices in the form of zero-turn, hydrostatic transaxles (HZTs) that may be joined to form an integrated, zero-turn, hydrostatic transaxle is disclosed. The steering mechanism may comprise a steering wheel. While the described hydrostatic devices are in the form of transaxles, the disclosed invention may be used with a variety of hydrostatic devices, including separate hydraulic pumps and hydraulic wheel motors, as would be understood by one of ordinary skill in the art.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
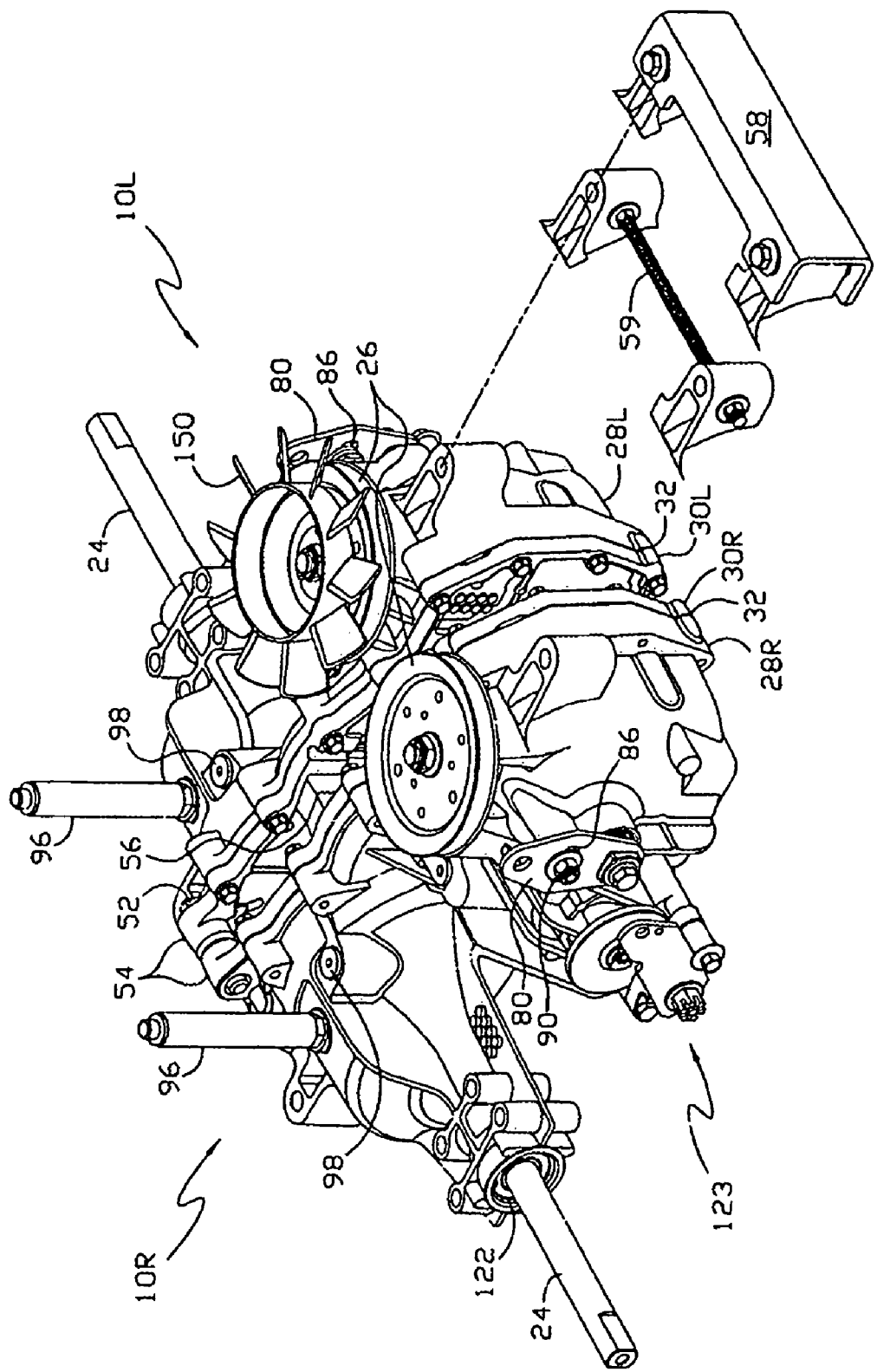
FIG. 1 illustrates a perspective view of an exemplary, integrated, zero-turn, hydrostatic transaxle constructed in accordance with the principles of the subject invention further illustrating an exemplary, outboard, disk brake mechanism and various casing attachment mechanisms.

Turning now to the figures, wherein like reference numerals refer to like elements, there is illustrated a zero-turn, hydrostatic transaxle generally used to drive a vehicle, such as a walk behind mover, snow thrower, riding mower, tractor, or other vehicle desiring a zero turn radius. As particularly illustrated in FIGS. 1–9, the zero-turn, hydrostatic transaxle is comprised of a pair of generally mirror image HZTs 10L and 10R that are each used to independently drive a single axle shaft 24. While HZTs 10L and 10R can be used independently, HZTs 10L and 10R may be adapted to be attached to one another in a manner described hereinafter to form an integrated, zero-turn, hydrostatic transaxle.

As will be understood by those of skill in the art, and as particularly illustrated in FIGS. 16–22, each HZT 10 generally operates on the principle of an input shaft 12 rotatably driving a hydraulic pump 14 which, through the action of its pump pistons 16, pushes hydraulic fluid to a hydraulic motor 18 through porting formed in a center section 20 to cause the rotation of hydraulic motor 18. The rotation of hydraulic motor 18 causes the rotation of a motor shaft 22 which rotation is eventually transferred through a gearing system or the like to drive axle shaft 24. A motive force from, for example, an engine may be supplied directly to input shaft 12 or indirectly by means of a pulley 26. For a more detailed description of the principles of operation of such a hydrostatic transaxle, the reader is referred to U.S. Pat. Nos. 5,201,692 and 6,122,996 which are incorporated herein by reference in their entirety.

To house these components, each HZT 10 is provided with a casing wherein the casings of each HZT 10L and 10R are generally mirror images of one another. In one embodiment, the casing is comprised of first casing members 28L and 28R and second casing members 30L and 30R (in the form of end caps) that are joined along a substantially vertical junction surface 32, as is illustrated in FIGS. 1–4. In this embodiment, for accepting fasteners 52, each HZT 10 can be provided with a plurality of bosses 54 (illustrated as three by way of example only) having fastener accepting openings. The fasteners 52 are passed through the fastener accepting openings of adjacent bosses 54 (which may be formed in both the first and second casing sections or one of the casing sections alone) to mate HZTs 10L and 10R to form the integrated unit. The casing of each HZT 10L and 10R can also be provided with a flat surface 56 that engages flat surface 56 of the opposite HZT 10 to provide an additional point of contact between HZTs 10. Thus, individual HZTs 10L and 10R also may be joined along a substantially vertical junction surface to thereby form the integrated, zero-turn, hydrostatic transaxle assembly.

Figure 2:
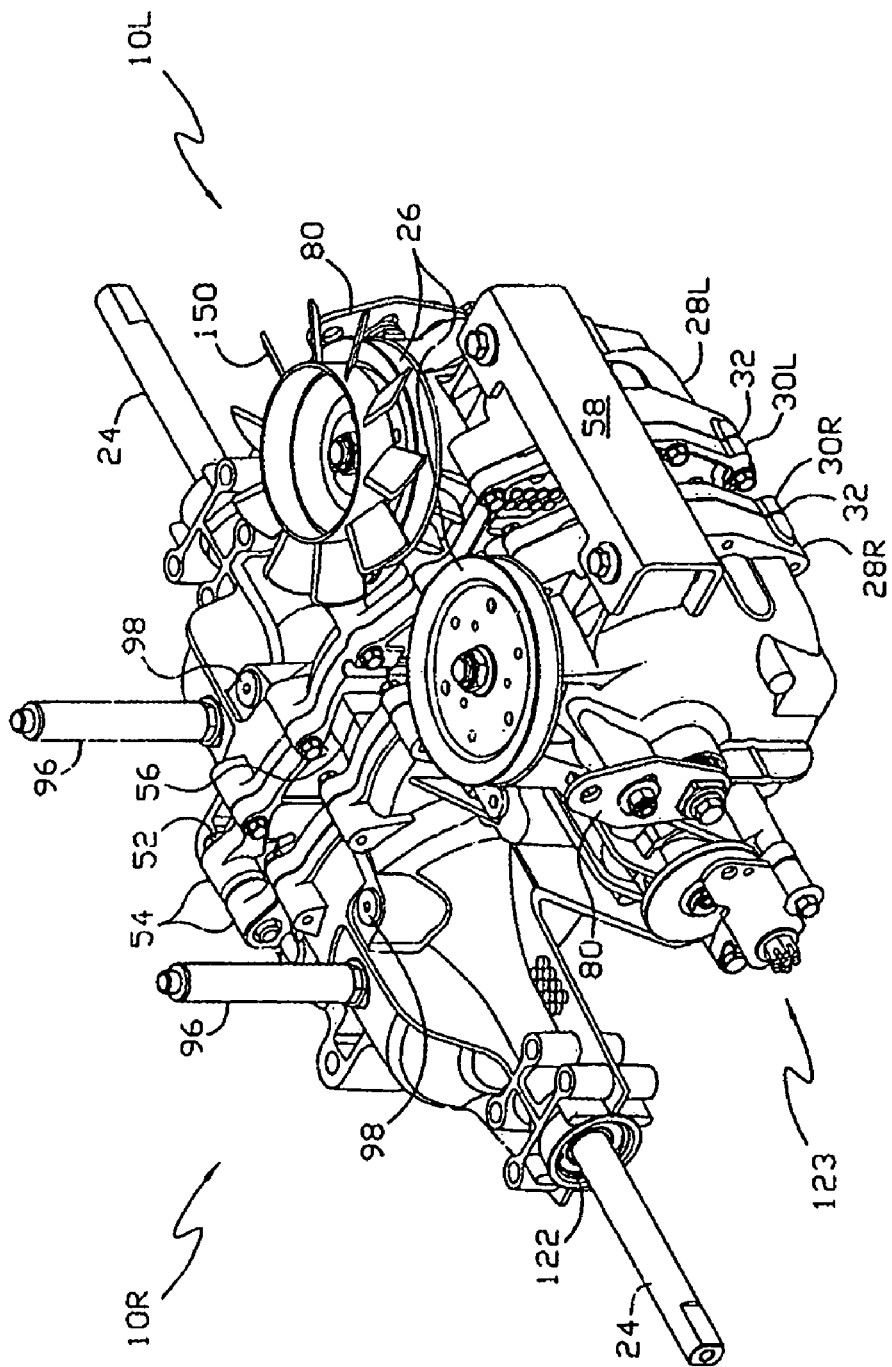
FIG. 2 illustrates a perspective view of the integrated, zero-turn hydrostatic transaxle of FIG. 1 with an exemplary bracket attachment mechanism.
Figure 3:
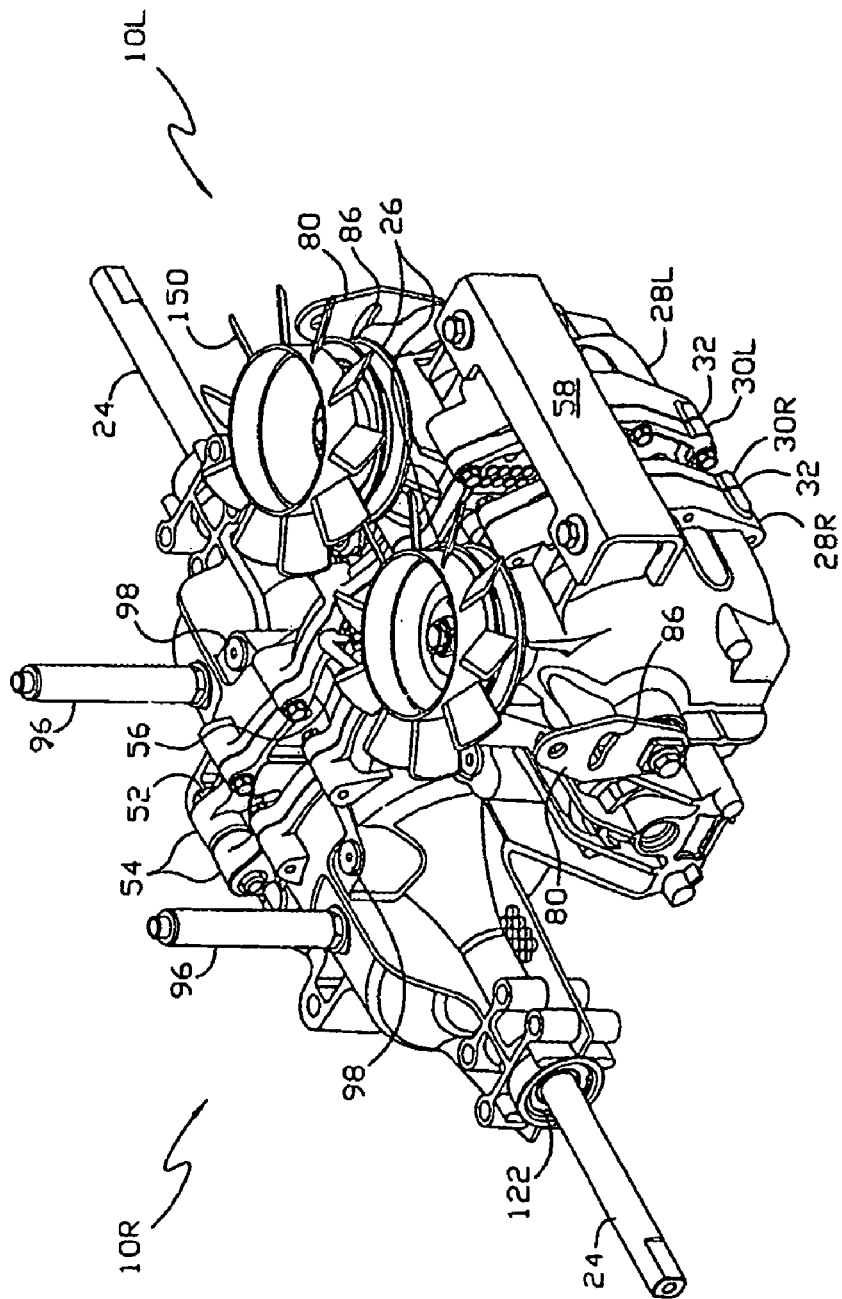
FIG. 3 illustrates a perspective view of the integrated, zero-turn hydrostatic transaxle of FIG. 1 with an exemplary, inboard, disk brake mechanism.
Figure 4:
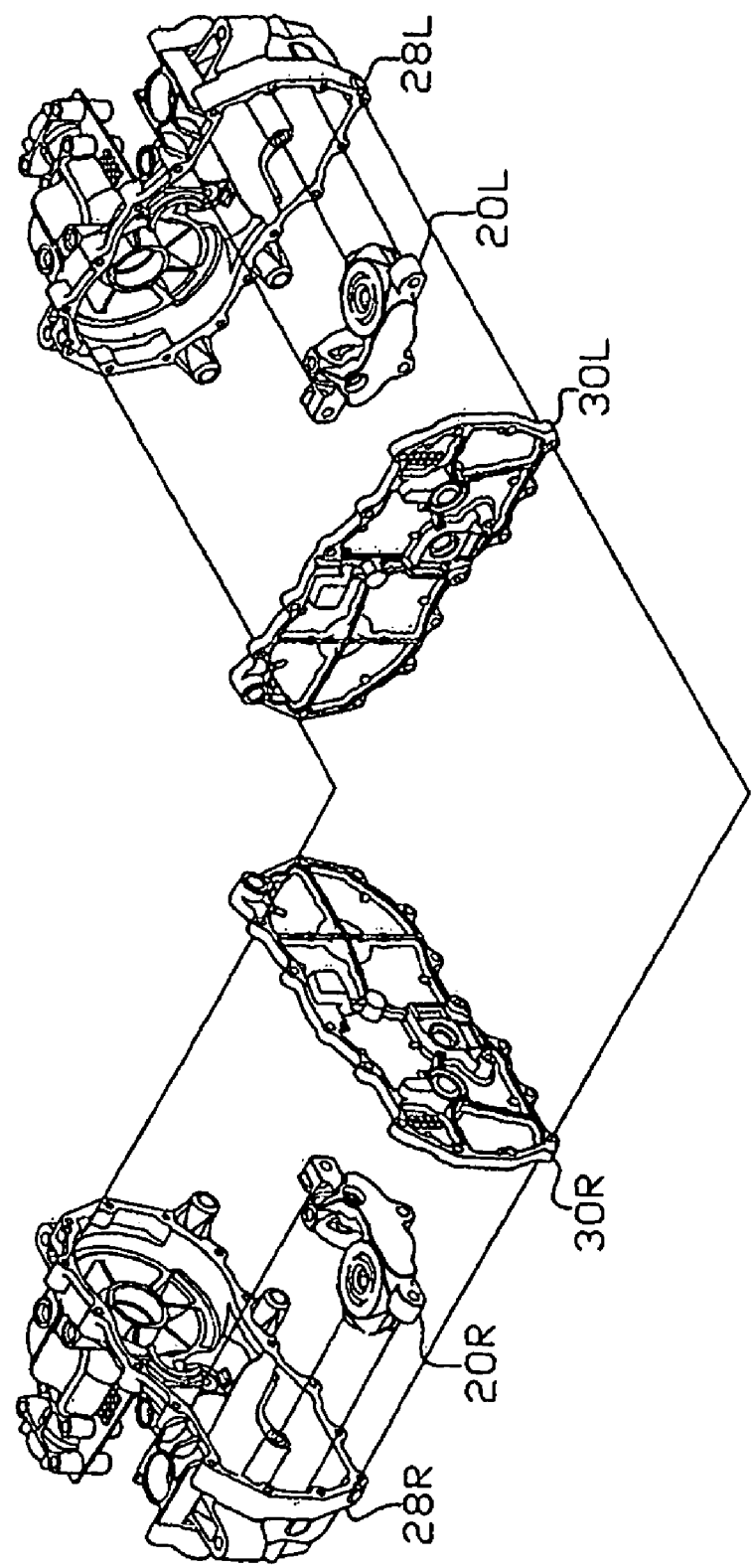
FIG. 4 illustrates an exploded view of exemplary casing members and center sections of the integrated, zero-turn hydrostatic transaxle of FIG. 1.
Figure 5:
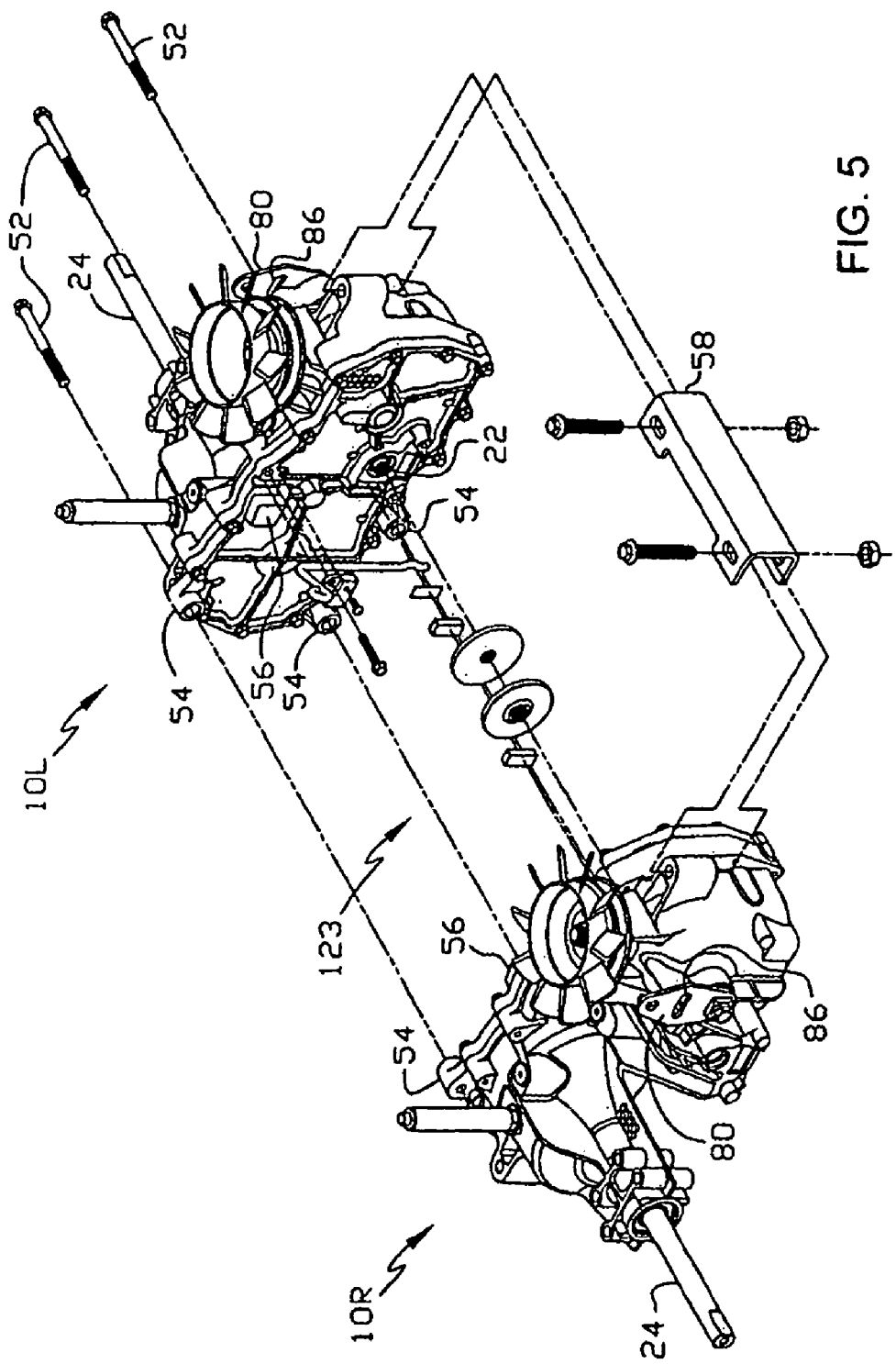
FIG. 5 illustrates an exploded view of the integrated, zero-turn hydrostatic transaxle of FIG. 3 particularly illustrating the exemplary, inboard, disk brake mechanism and attachment hardware.

To maintain the attachment between HZTs 10L and 10R, a bracket 58 may be fastened between each of the HZT casings as illustrated in FIGS. 1–3. For this same purpose and by way of further example, a rod 59 having opposing threads that are adapted to engage correspondingly threaded apertures formed in the casings of HZTs 10 may be utilized. Still further, a threaded rod may pass through un-threaded openings in the casings and nuts may be threaded to the rod to maintain the attachment between HZTs 10. In yet another configuration, one or more bosses on the front portions of the casings of HZTs 10 may be fastened to a vehicle frame to resist torque induced by movement of axle shafts 24 and maintain the orientation of HZTs 10L and 10R with respect to one another. This fastening technique may be used alone or in conjunction with other fastening techniques such as aforementioned bracket 58 or threaded rod 59.

Figure 6:
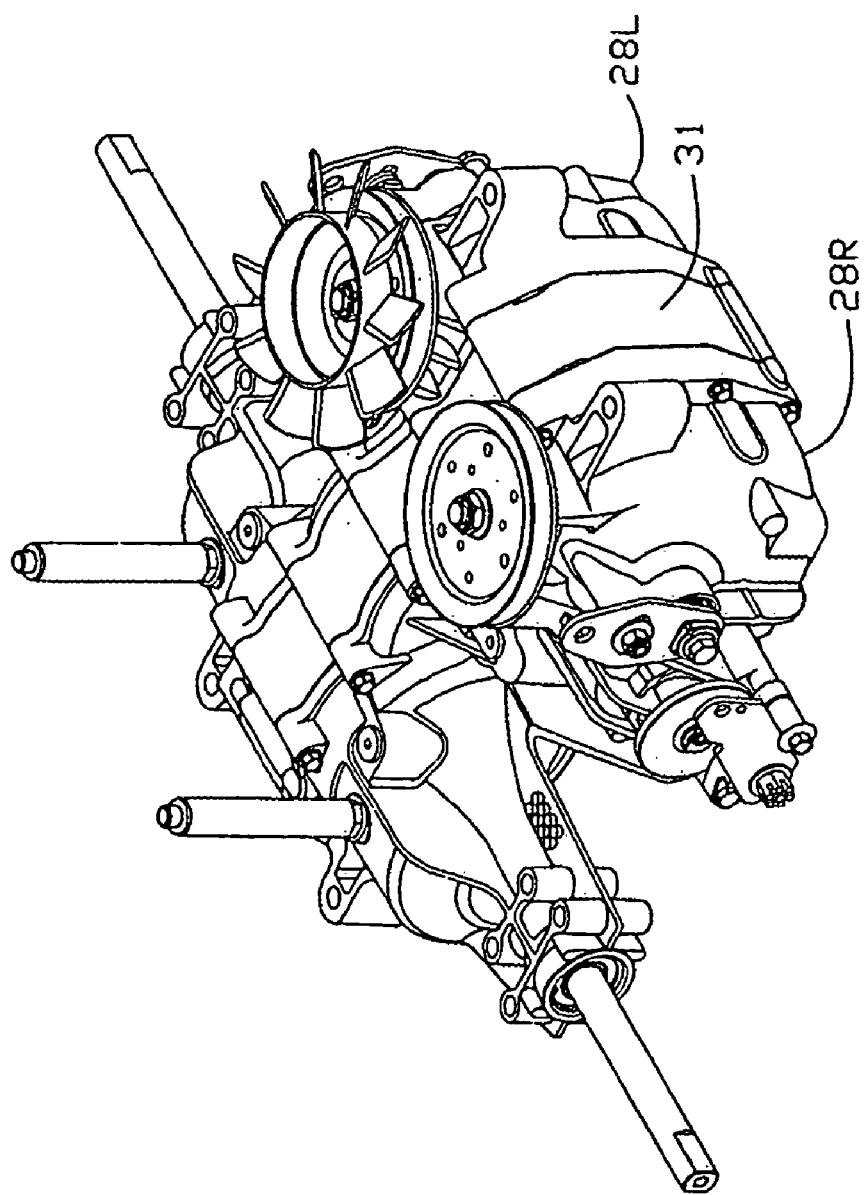
FIG. 6 illustrates a perspective view of a further exemplary embodiment of the integrated, zero-turn hydrostatic transaxle of FIG. 1 wherein a single plate replaces the cap members of the casings.
Figure 8:
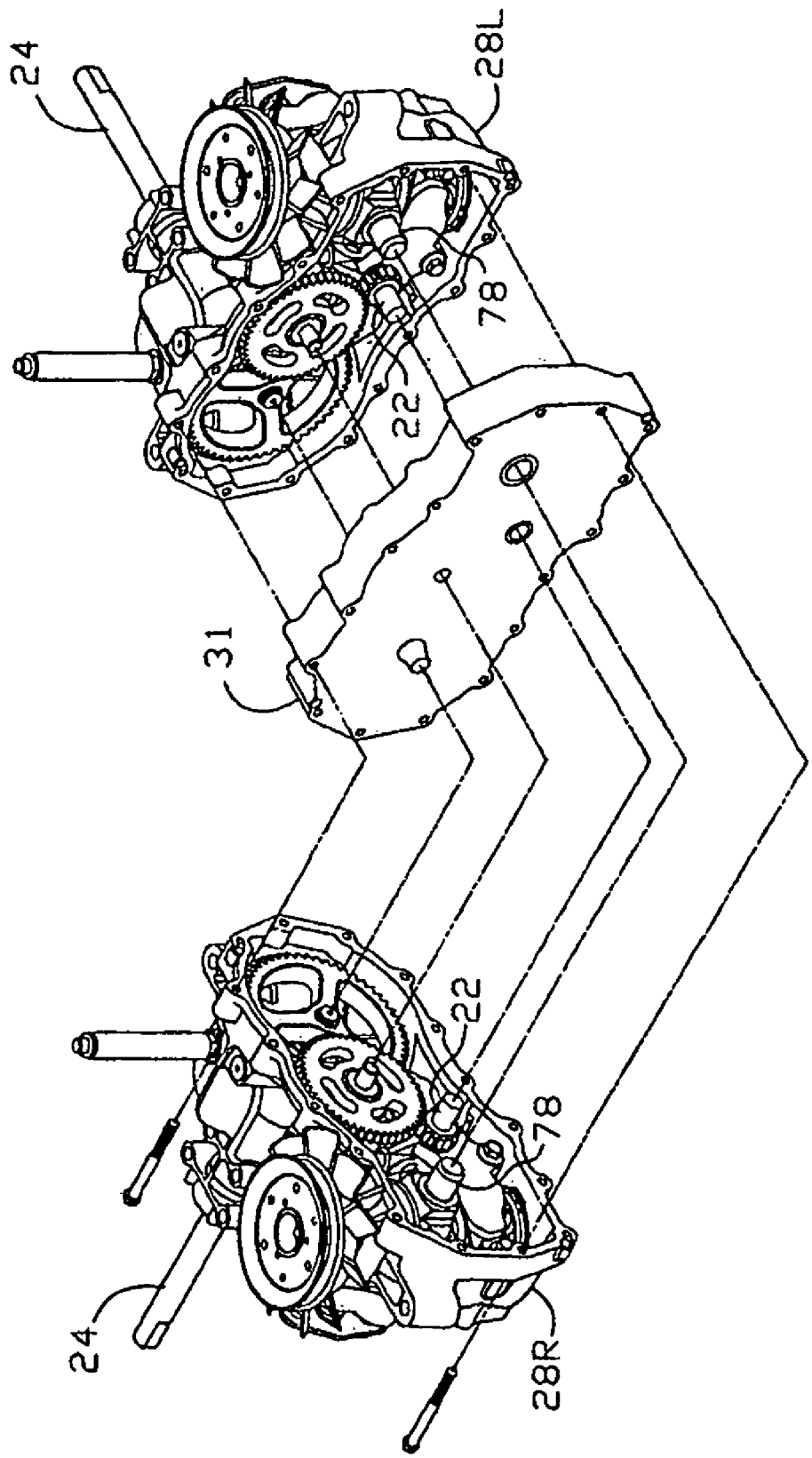
FIG. 8 illustrates an exploded view of the integrated, zero-turn hydrostatic transaxle of FIG. 6.

As illustrated in FIGS. 6 and 8, the casing may alternatively be arranged such that second casing sections 30 are replaced by a single, unitary casing section 31 to which first casing sections 28 are attached. In this case, casing section 31 generally comprises a plate having openings for accepting various fasteners and junction or sealing surfaces 32 between casing section 31 and first casing sections 28 lie in parallel, vertical planes. In this embodiment, there is minimal fluid transfer between the two units because of the high tolerances involved in the fit of various shafts into the bores. It will be appreciated that the illustrated bores need not be through holes but could be partially bored to accept the shafts of each unit while leaving an intermediate sealing surface. Bearings may be inserted into the bores, but these may or may not be necessary depending upon anticipated loads. Casing section 31 (as well as plate member 33 described below) may be fabricated from bar stock, be die cast, or the like.

Figure 7:
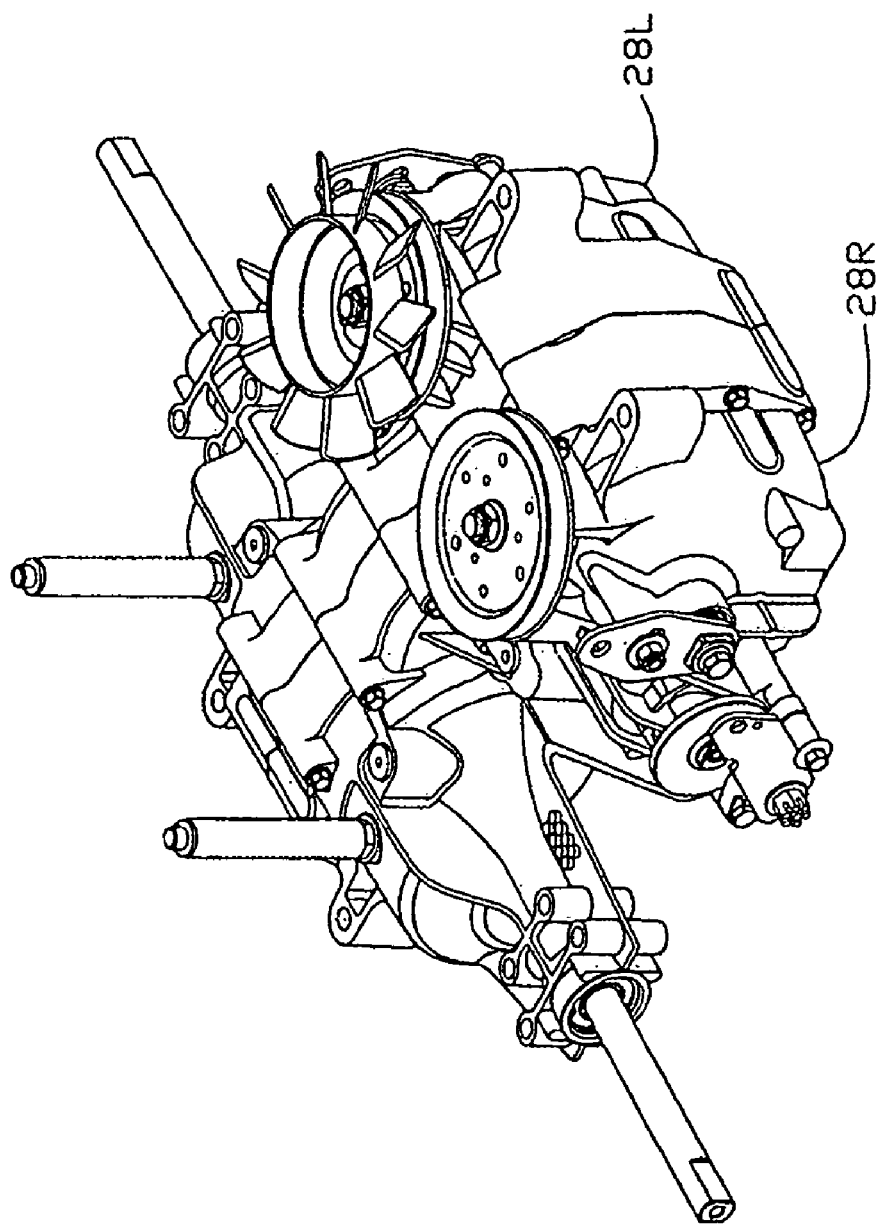
FIG. 7 illustrates a perspective view of yet another exemplary embodiment of the integrated, zero-turn hydrostatic transaxle of FIG. 1 wherein a single internal plate replaces the cap members of the casings.
Figure 9:
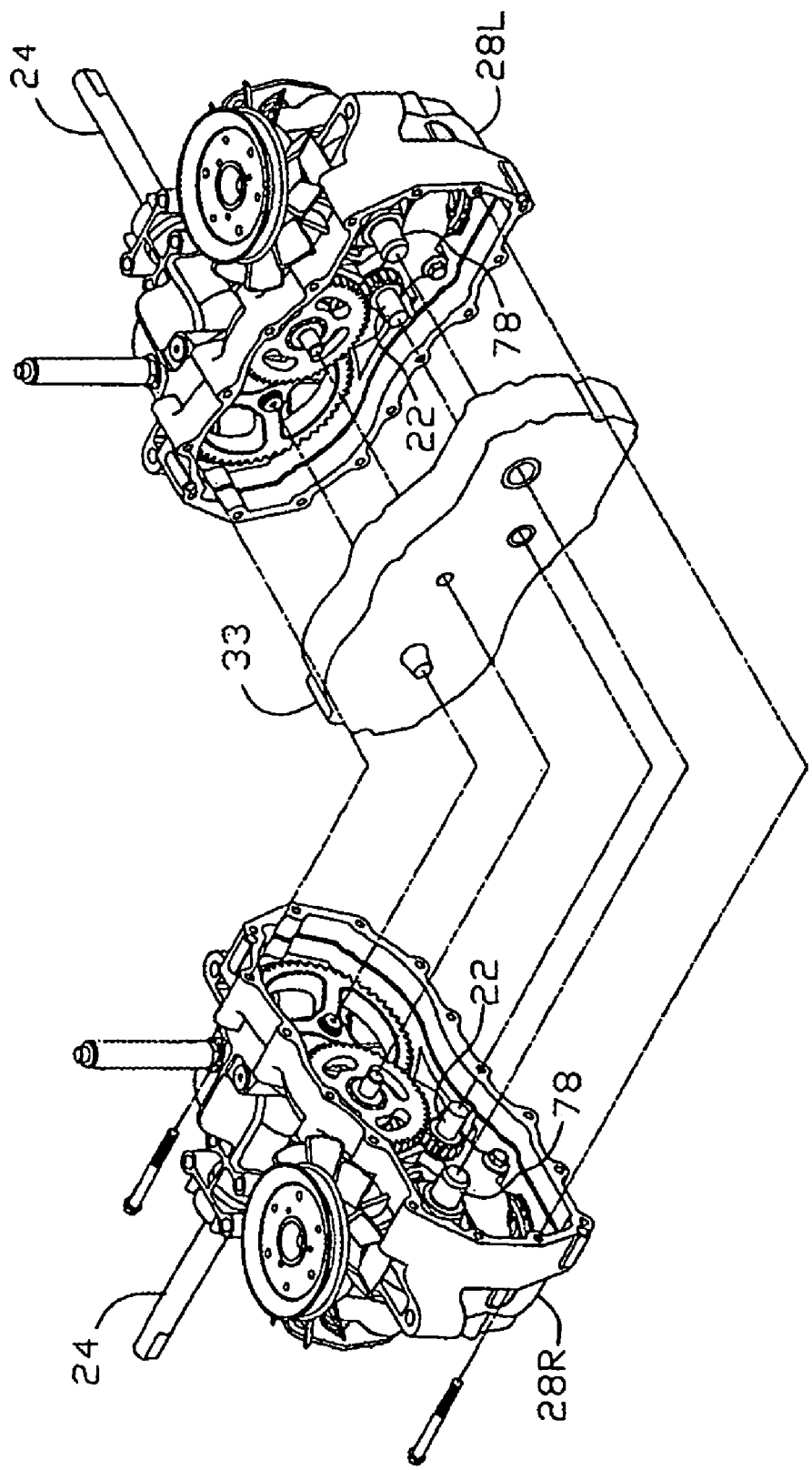
FIG. 9 illustrates an exploded view of the integrated, zero-turn hydrostatic transaxle of FIG. 7.

Still further, as illustrated in FIGS. 7 and 9, the casing may comprise a plate member 33 adapted to be attached over the interface of one or both first casing sections 28 at a vertical junction surface. In this embodiment, first casing sections 28 of both HZTs 10 would be attached directly to one another at a single sealing surface using fasteners that pass through the openings in adjacent bosses. As a result of the joining of first casing sections 28, plate member(s) 33 would be located internally with respect to attached casing sections 28. Plate member(s) 33 could be used to prevent movement of fluid from one HZT 10 to the other HZT 10 or allow leakage across bearings, cross holes, portings, and/or the like to allow for a single fluid fill. In the embodiment particularly illustrated in FIG. 8, cross holes are provided to accept the various shafts of HZT 10.

In each of the illustrated embodiments, vertically extending from the top of first casing member 28 is input shaft 12 and horizontally extending from and supported by first casing member 28 is axle shaft 24. Thus, the axis of axle shaft 24 is generally perpendicular to the substantially vertical junction surfaces of the casing. Similarly, the plane of pump running surface 34 of center section 20 is generally perpendicular to the substantially vertical junction surfaces while the plane of motor running surface 36 of center section 20 is generally parallel to the substantially vertical junction surfaces. The axis of motor shaft 22 is also seen to be generally parallel to the axis of axle shaft 24. It is to be understood, however, that this arrangement of components is merely illustrative and that the components can be otherwise arranged without departing from the scope of this invention.

Figure 24:
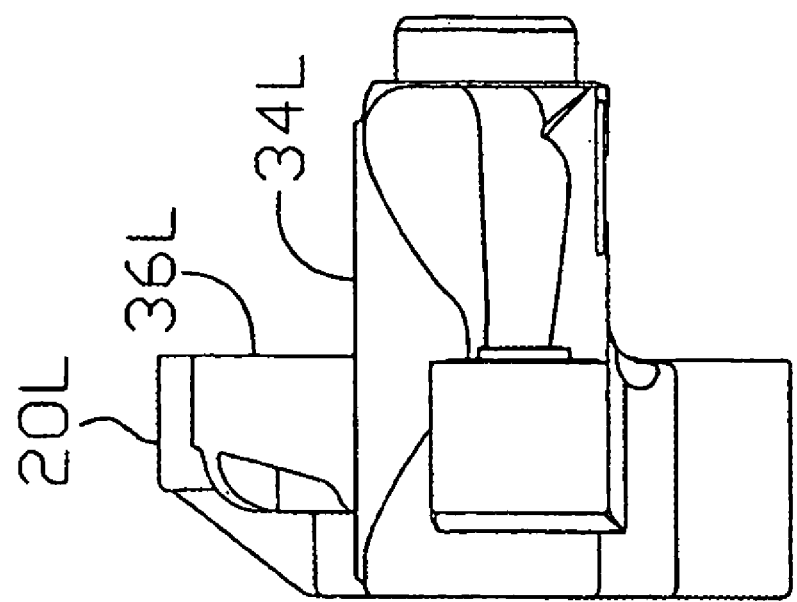
FIG. 24 illustrates a pump end view of exemplary center sections for use in connection with the integrated, zero-turn, hydrostatic transaxle of FIG. 1.
Figure 24:
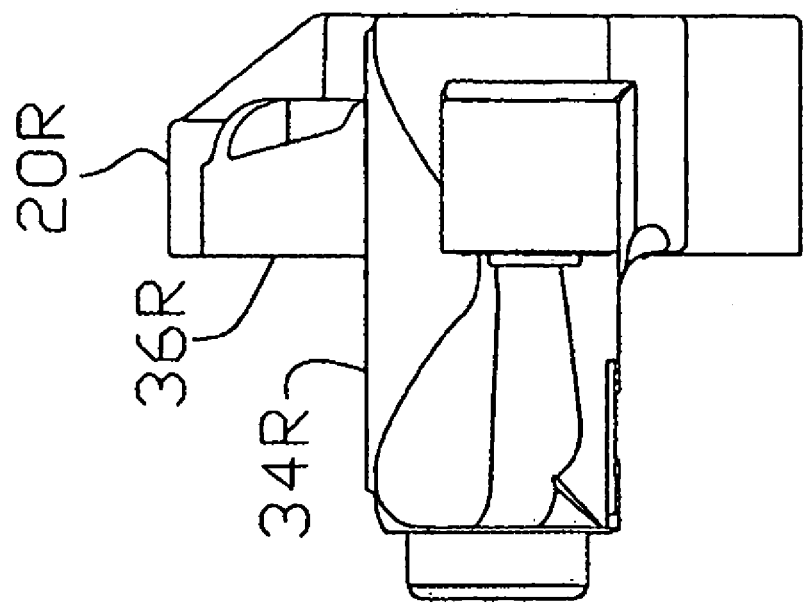
Figure 25:
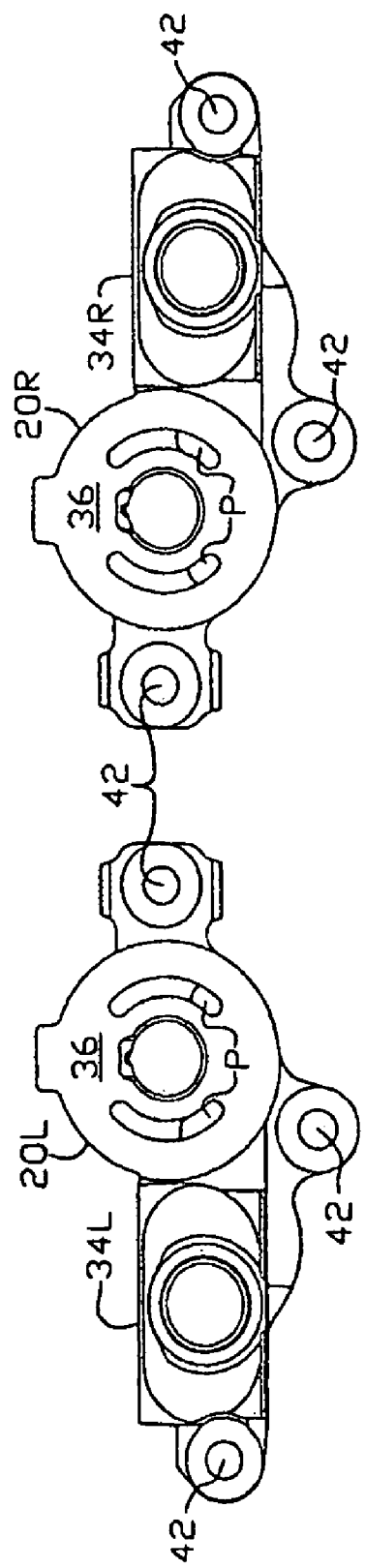
FIG. 25 illustrates a motor end view of the exemplary center sections of FIG. 24.
Figure 26:
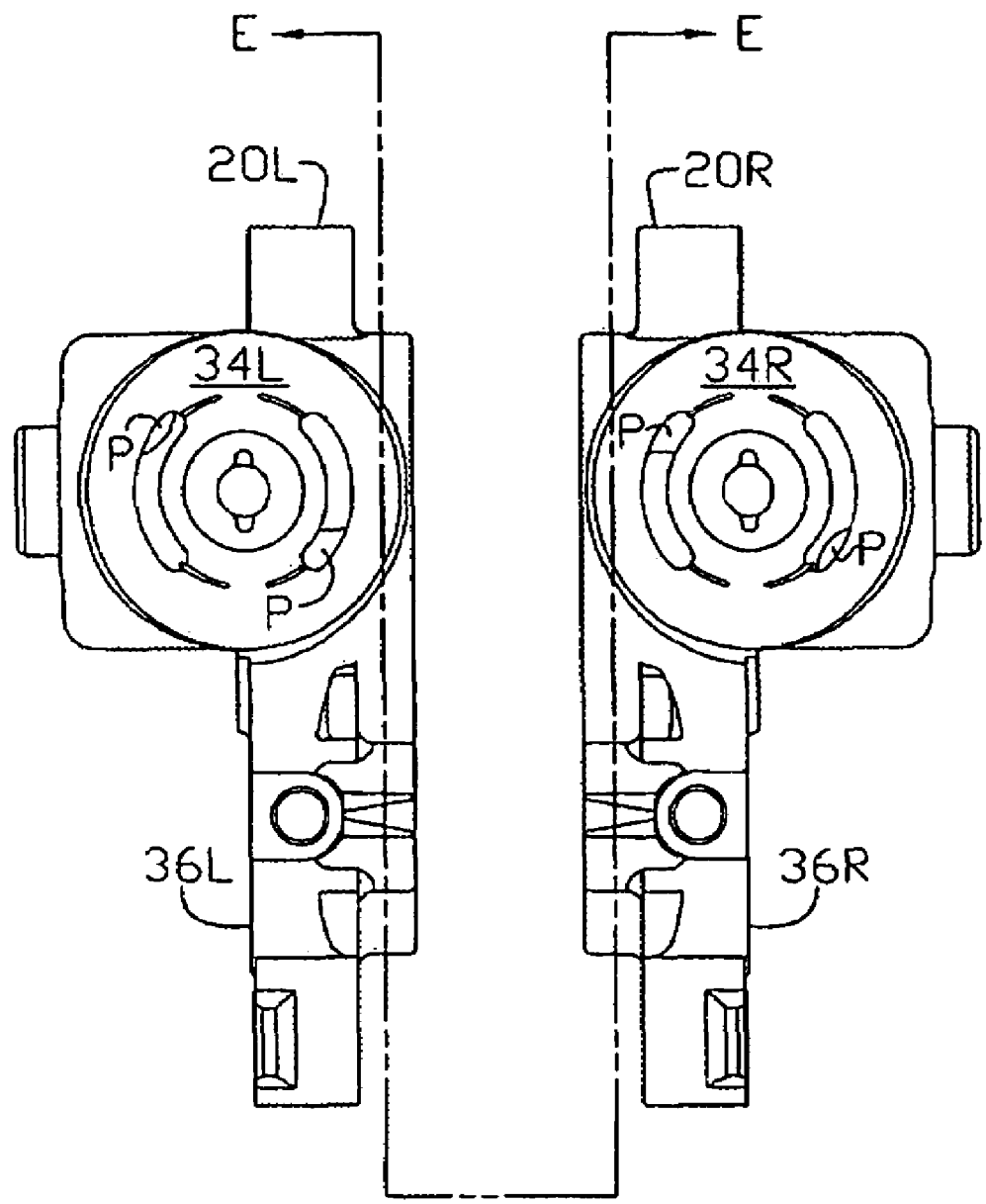
FIG. 26 illustrates a top view of the exemplary center sections of FIG. 24.
Figure 27:
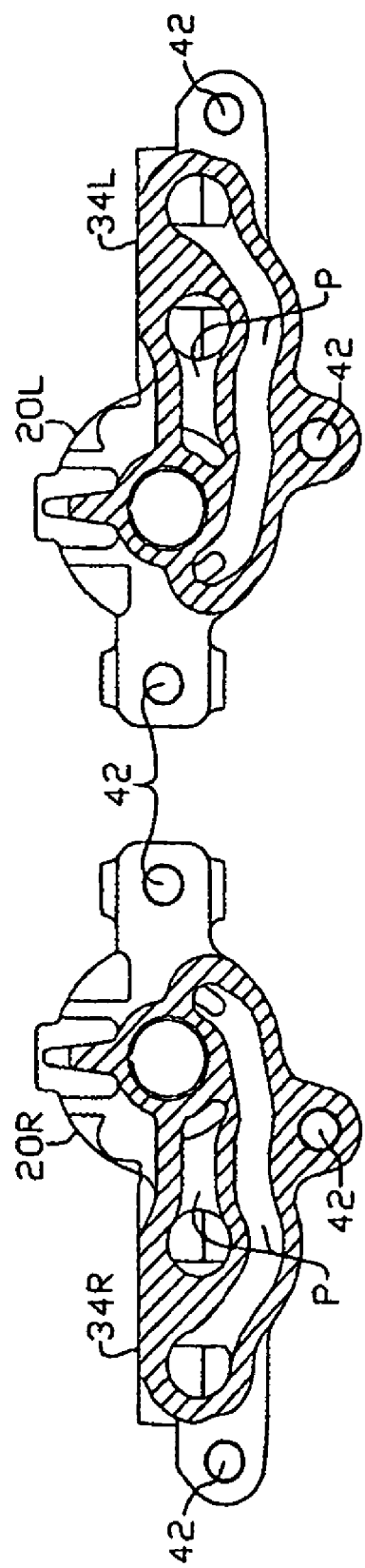
FIG. 27 illustrates a cross-sectional view of the exemplary center sections along lines E—E of FIG. 26.

For placing hydraulic pump 14 in fluid communication with hydraulic motor 18, center section 20 includes hydraulic porting P, as is illustrated in FIGS. 25–28. As will be further seen in these figures as well as FIG. 24, center sections 20L and 20R of HZTs 10L and 10R, respectively, are generally mirror images of one another. However, since input shafts 24 are rotated in the same direction when the vehicle is driven in the forward or reverse direction, the intersection of the kidneys, formed on running surface 34, and the cross passages of porting P are symmetrical as seen in FIG. 26. It will be appreciated, however, that center sections 20L and 20R can be full mirror images of one another in the case where the angular rotation of the swash plates of each HZT are made non-symmetrical, i.e., the angle of rotation of the swash pates are reversed with respect to one another.

Hydraulic porting P is in further fluid communication with a source of makeup fluid, such as a fluid sump or a charge gallery, for example, by means of check plugs 60. Generally, hydraulic porting P comprises a high pressure side through which fluid moves from hydraulic pump 14 to hydraulic motor 18 and a low pressure side through which fluid returns from hydraulic motor 18 to hydraulic pump 14. Since center sections 20L and 20R are generally mirror images of one another, it will be appreciated that similar hydraulic porting P will be utilized when both HZTs 10L and 10R are placed in the forward or reverse direction. This arrangement of center section porting P provides HZTs 10L and 10R with nearly identical hydraulic efficiencies.

Figure 28:
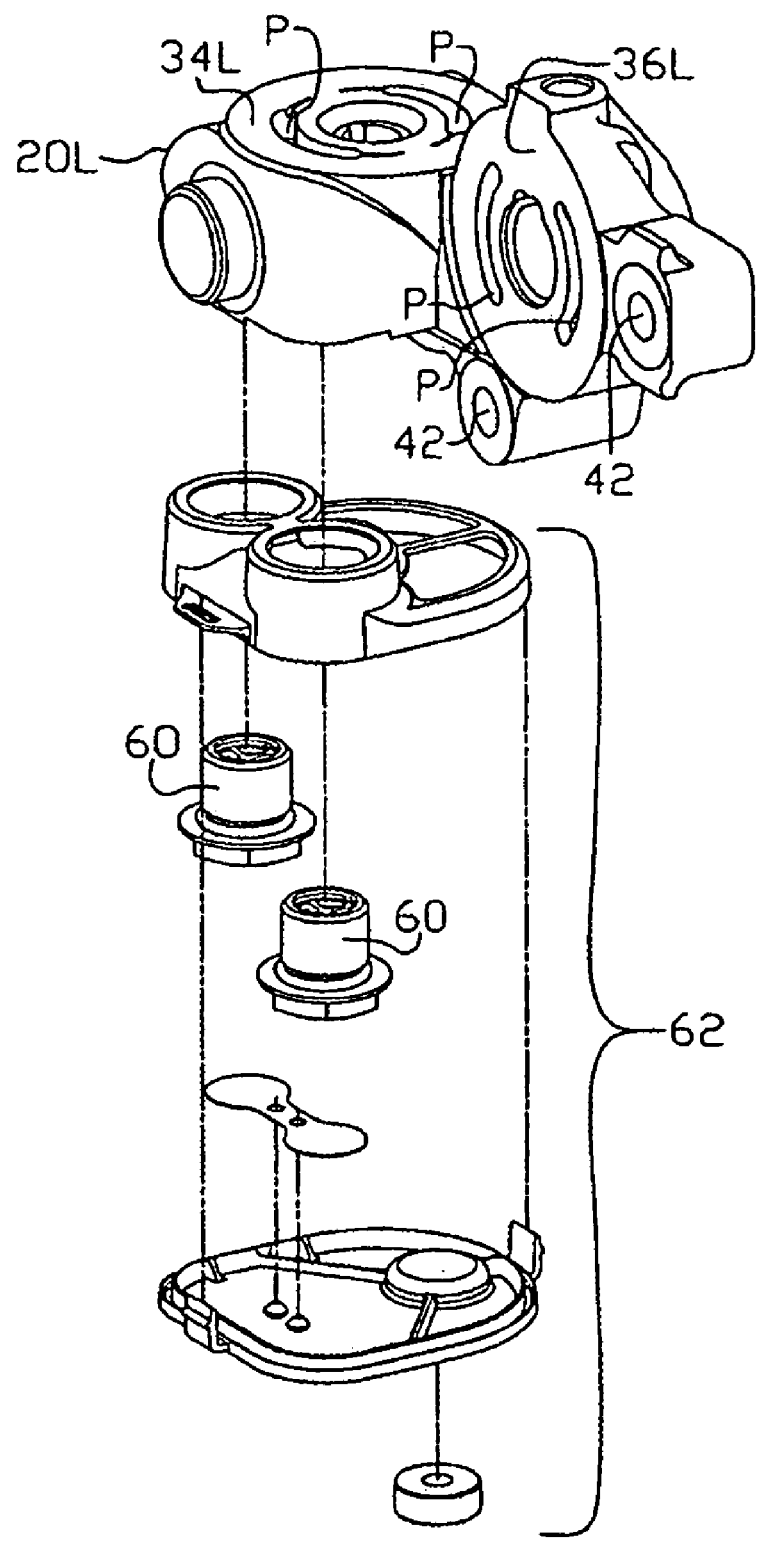
FIG. 28 illustrates an exploded view of an exemplary filter assembly for use in connection with the integrated, zero-turn hydrostatic transaxle of FIG. 1.

To minimize the introduction of impurities, such as metal shavings, into the hydraulic circuit when makeup fluid is drawn into the hydraulic circuit, an upward facing filter assembly 62, illustrated in FIG. 28, may be positioned adjacent to center section 20 through which fluid may pass from the sump to hydraulic porting P. Upward facing filter assembly 62 reduces the potential that air is ingested into hydraulic porting P as it provides an upward facing exit path for the air. This is especially the case when filter assembly 62 is positioned in a generally non-turbulent area of operation within HZT 10.

For attaching center section 20 to first casing member 28, fasteners 40 (e.g., bolts) may be passed through openings 42 formed in center section 20 to mate with attachment points 44 (e.g., threaded holes) formed in first casing member 28.

For adjusting the amount of oil that is pushed from hydraulic pump 14 to hydraulic motor 18 via the high pressure side of hydraulic porting P, each HZT 10 includes a moveable swash plate 74 against which pump pistons 16 travel. The direction of rotation of hydraulic pump 14 is fixed by the rotation of input shaft 12. Hydraulic pump 14 is nearly always rotated in one direction. As will be understood by those of ordinary skill in the art, swash plate 74 may be moved to a variety of positions to vary the stroke of pump pistons 16 and the direction of rotation of hydraulic motor 18. Generally, as swash plate 74 angle is varied in one direction from the neutral position the stroke of pump pistons 16 is varied, which then drives hydraulic motor 18 in a direction determined by the hydraulic porting at a speed determined by the volume of the fluid displaced by pump pistons 16 and the torque delivered by input shaft 12. As will be appreciated, rotation of hydraulic motor 18 results from motor pistons 19 moving against a thrust bearing 76 under the influence of the hydraulic fluid. As the angle of swash plate 74 is decreased to pass through the neutral position, the direction of rotation of hydraulic motor 18 is reversed and the speed of hydraulic motor 18 is again determined by the volume of fluid displaced by pump pistons 16 and the torque delivered by input shaft 12.

Since the speed of rotation of hydraulic motor 18 is dependent upon the amount of hydraulic fluid pumped thereinto by hydraulic pump 16 and the direction of rotation of hydraulic motor 18 is dependent upon the direction of angular rotation of swash plate 74, the positioning of swash plate 74 is seen to control the speed and direction of rotation of hydraulic motor 18 and, as will be apparent, the speed and direction of rotation of axle shaft 24. While it is true that the direction of rotation of hydraulic motor 18 will be affected by the rotation of hydraulic pump 16, the variation of rotation from one direction to another is accomplished completely by swash plate 74.

Figure 18:
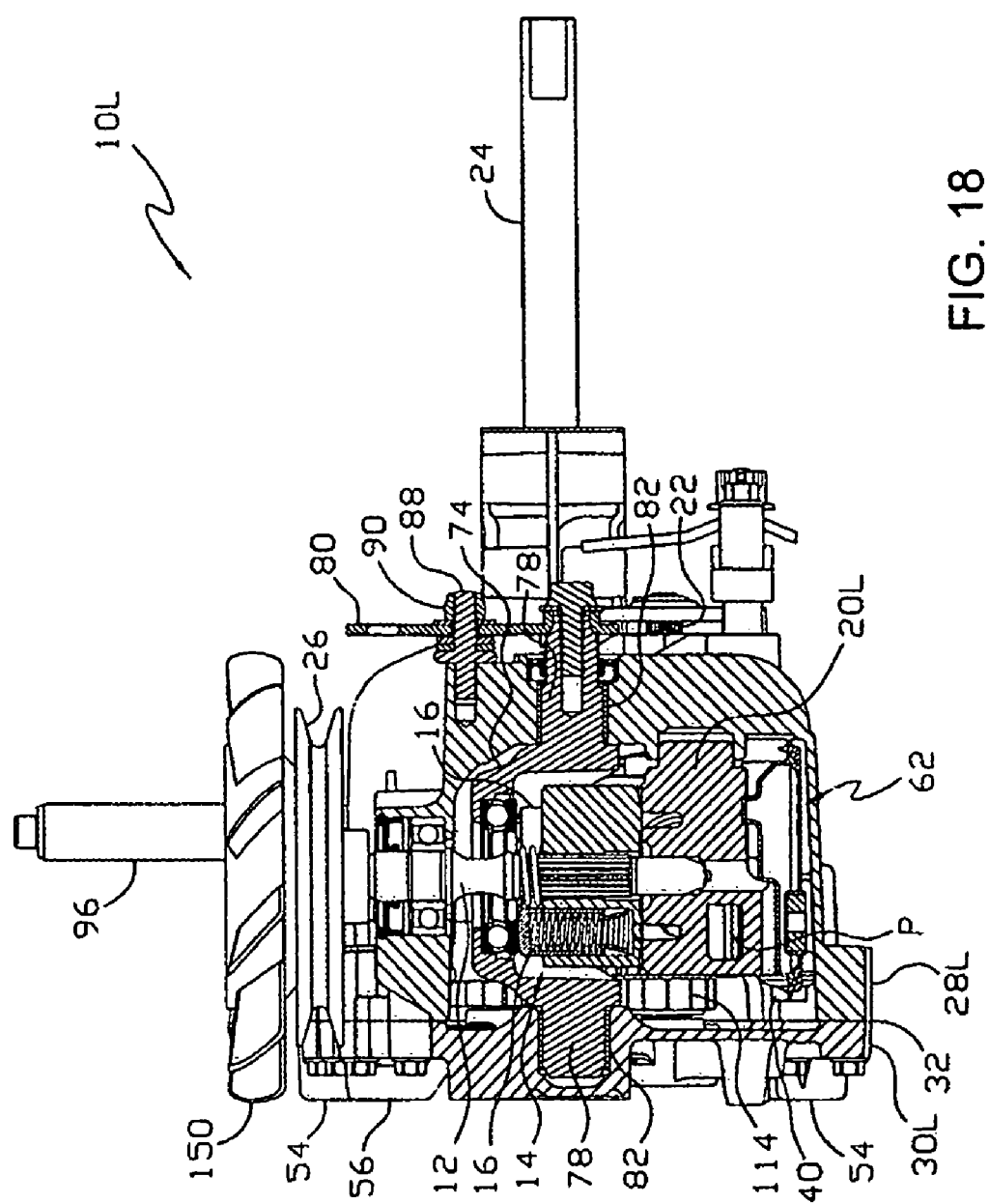
FIG. 18 illustrates a cross-sectional view of the exemplary, zero-turn, hydrostatic transaxle along line A—A of FIG. 15 with an exemplary, outboard control arm mechanism and outboard brake mechanism.
Figure 19:
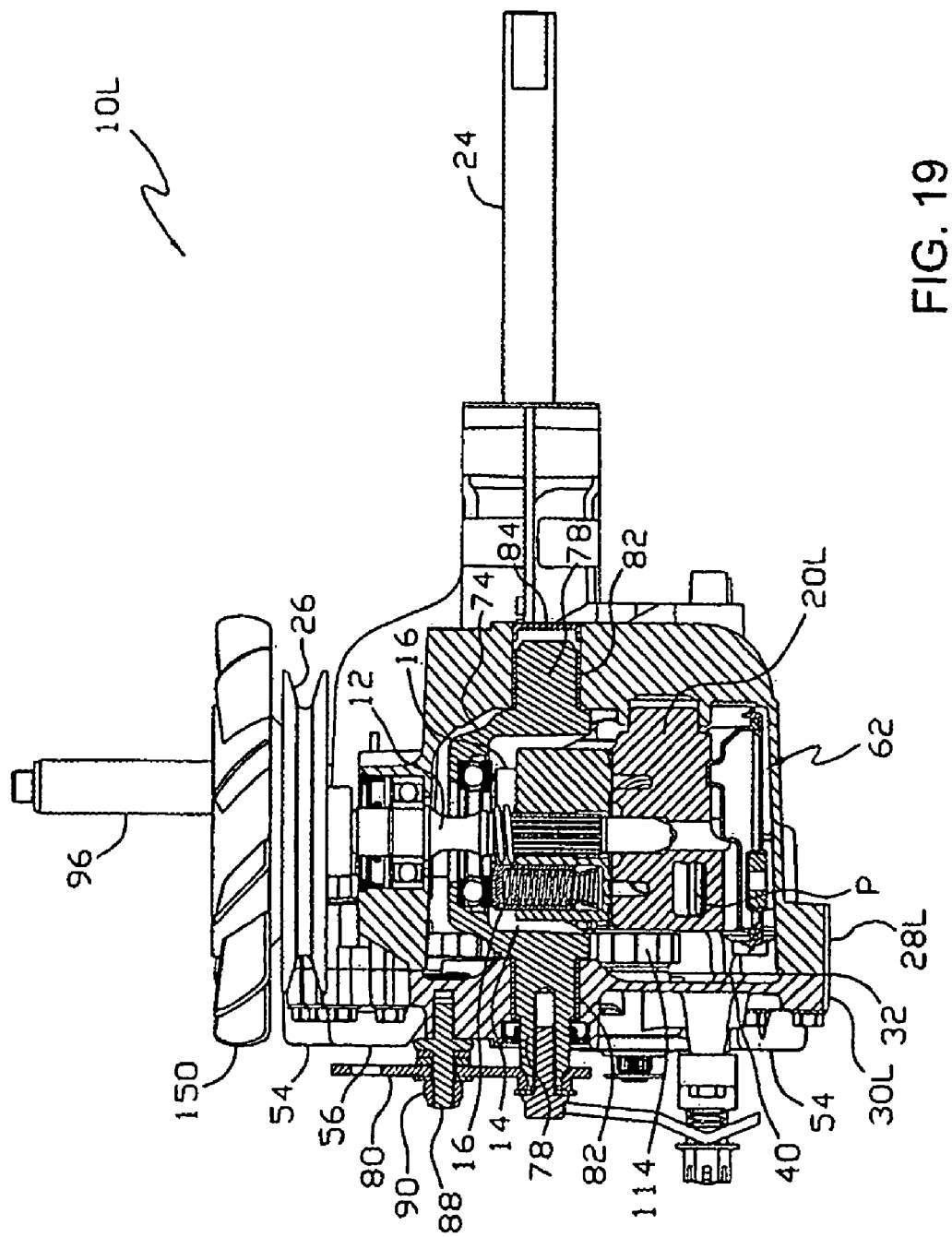
FIG. 19 illustrates a cross-sectional view of the exemplary, zero-turn, hydrostatic transaxle along line A—A of FIG. 15 with an exemplary, inboard control arm mechanism and inboard brake mechanism.

For moving swash plate 74, swash plate 74 is supported by a pair of trunnion arms 78 that are rotatably supported in the casing of HZT 10 as illustrated in FIGS. 18 and 19. As will be appreciated, rotation of trunnion arms 78 changes the angular orientation of swash plate 74 with respect to pump pistons 16. To rotate trunnion arms 78 and, accordingly, move swash plate 74, a speed adjusting mechanism is coupled to one of trunnion arms 78. A control arm 80 of the speed adjusting mechanism may be connected, via a driving link, to a lever or a pedal provided on a vehicle whereby movement of the lever or pedal is translated to control arm 80 to cause the rotation of trunnion arms 78 and movement of the swash plate assembly. A further, exemplary speed adjusting mechanism with a return-to-neutral mechanism 41 is illustrated in FIG. 8 of U.S. patent application Ser. No. 09/789,419, which is incorporated herein by reference in its entirety.

It is to be further appreciated that control arm 80 may be located on either the outboard or inboard side of the casing of HZT 10, as illustrated in FIGS. 18 and 19, respectively. To this end, first casing member 28 may be provided with a pair of opposed bearing seats 82 in which trunnion arms 78 are carried. The casing may then have openings adjacent to both bearing seats 82, illustrated in FIG. 19, by which control arm 80 can be attached to one of trunnion arms 78. Thus, depending upon the desired location for control arm 80, control arm 80 would be mated to one of trunnion arms 78 by way of one of the openings and the opposite opening would be closed with a seal 84. Alternatively, the casing can have an opening adjacent to just one bearing seat 82, as illustrated in FIG. 18. In this case, it will be appreciated that the location of the single opening will dictate whether control arm 80 is mounted on the inboard side or the outboard side of the casing of HZT 10. It will be further appreciated that when it is desired to have an inboard control arm 80 on an integrated, zero-turn, hydrostatic transaxle assembly, sufficient spacing is to be provided between the joined casings of HZTs 10L and 10R, similar to but larger than the spacing illustrated in FIGS. 1 and 2. The spacing is used to accommodate control arms 80 (as well as any inboard braking mechanisms that are described hereinafter).

Figure 14:
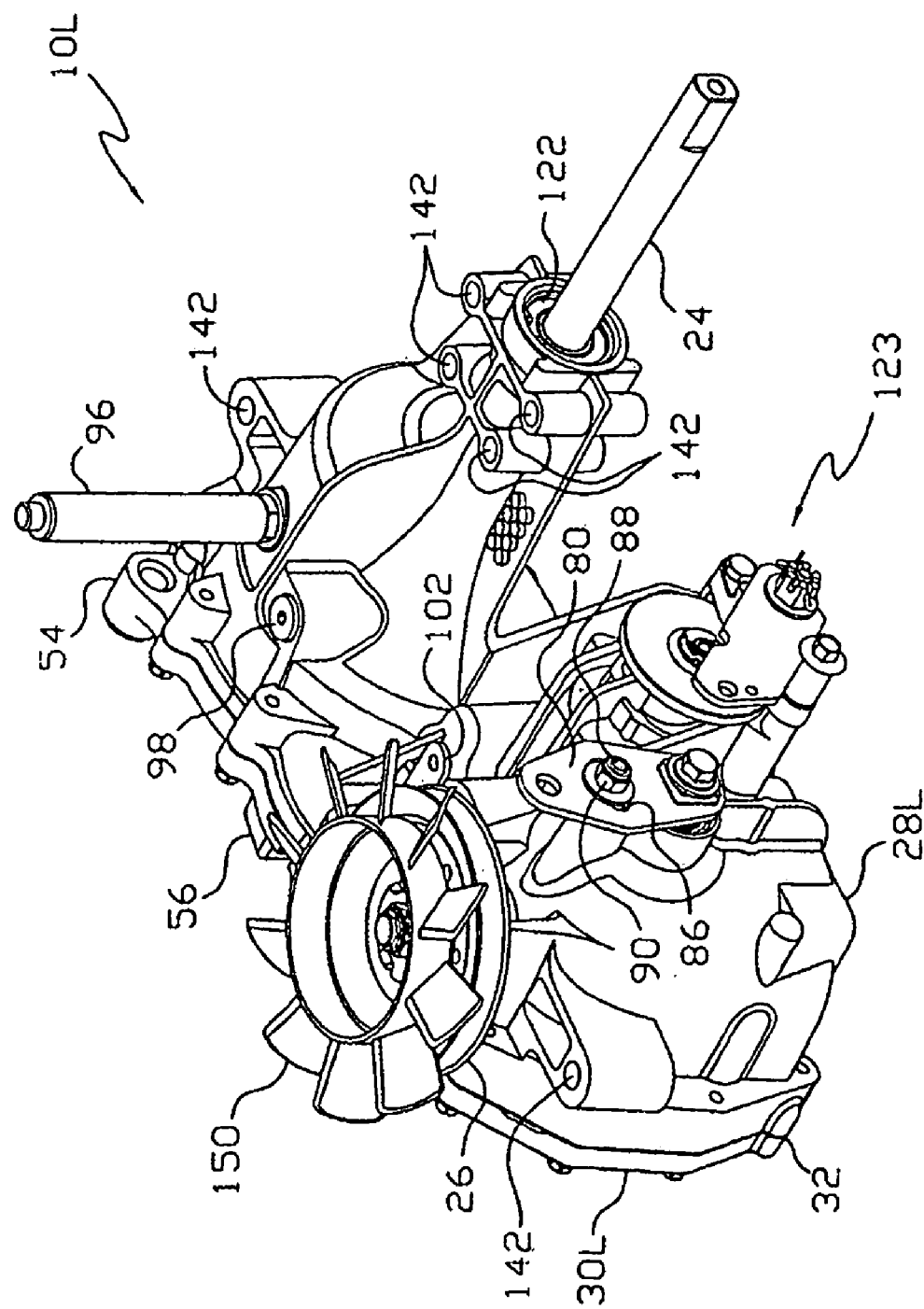
FIG. 14 illustrates a perspective view of the exemplary, zero-turn, hydrostatic transaxle of FIG. 10 further illustrating an exemplary, outboard, disk brake mechanism and outboard control arm mechanism.
Figure 15:
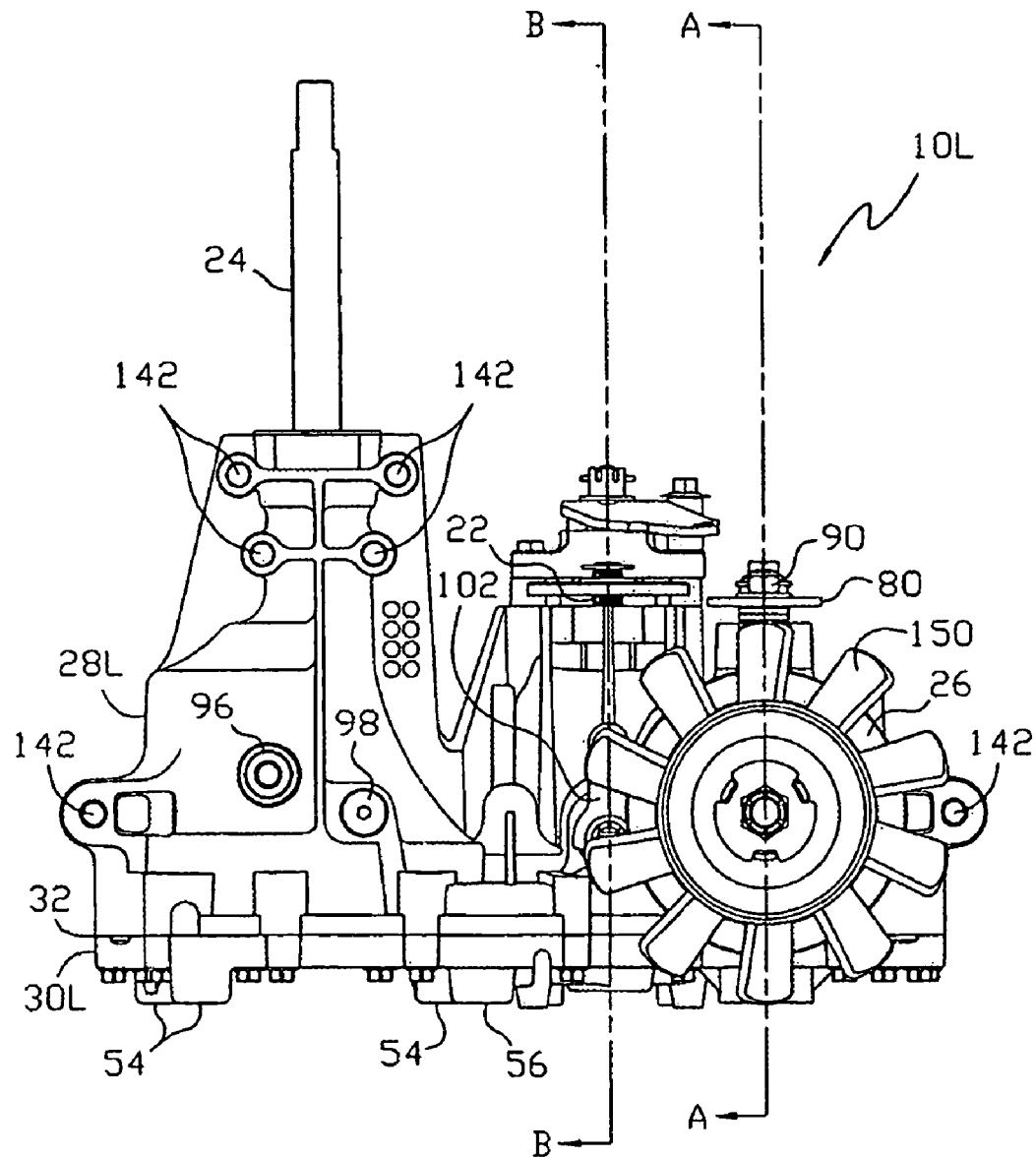
FIG. 15 illustrates a top view of the exemplary, zero-turn, hydrostatic transaxle of FIG. 14.

For limiting the range of motion of control arm 80, control arm 80 may be provided with a slot 86 that cooperates with a stop 88, such as a bolt or the like, attached to the casing as illustrated in FIG. 14. It will also be appreciated that control arm 80 may be locked into the neutral position, for example during shipment of HZT 10 and/or during assembly into a vehicle. To this end, as illustrated in FIG. 1, a nut 90 may be attached to stop 88 to frictionally engage the control arm mechanism and thereby prevent its movement. Slot 86 of control arm 80 may be asymmetrical to thereby allow a greater speed to be imparted to axle 24 in the forward direction as compared to the reverse direction.

Figure 16:
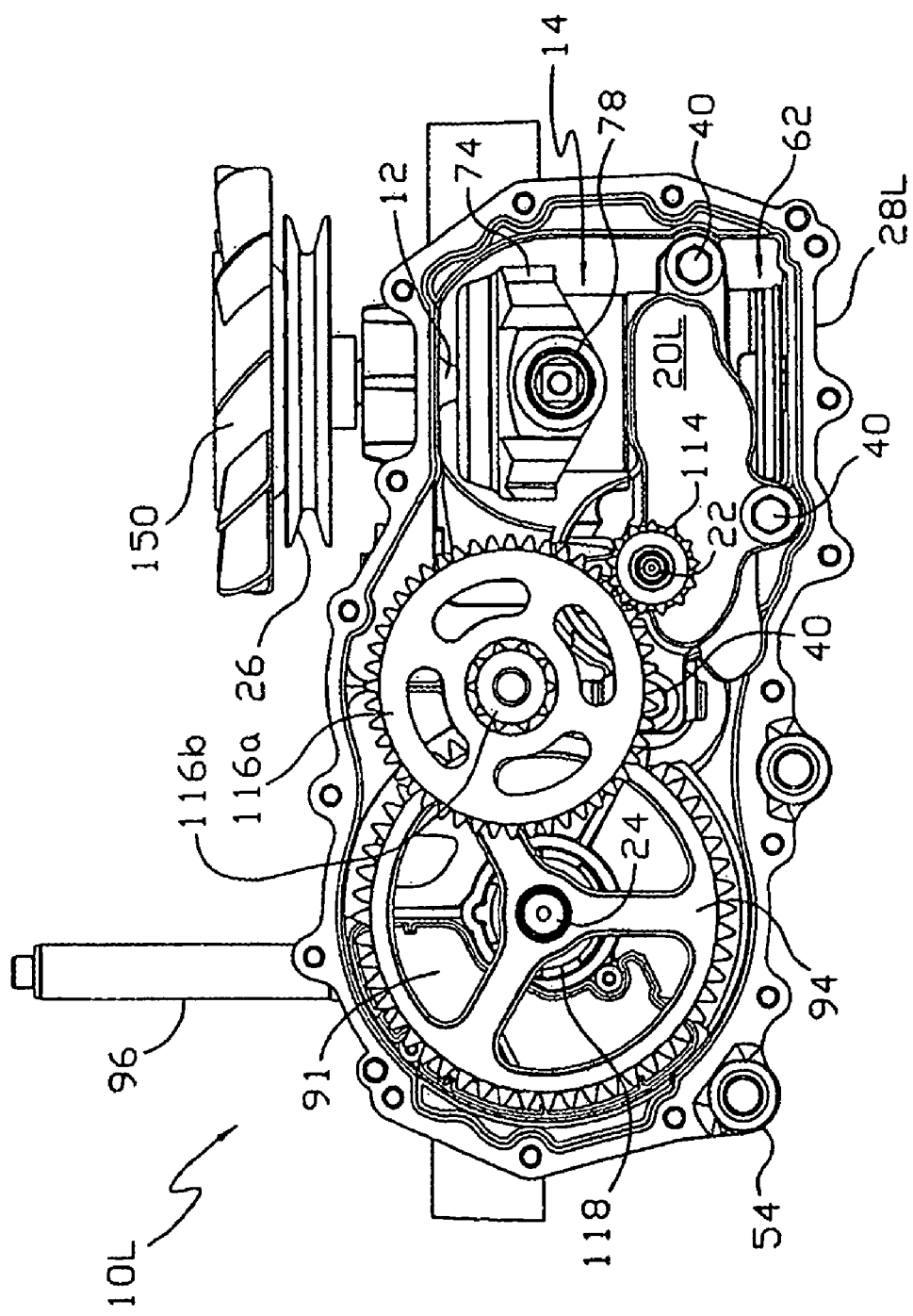
FIG. 16 illustrates a side view of the exemplary, zero-turn, hydrostatic transaxle of FIG. 12 with the cap member removed.
Figure 17:
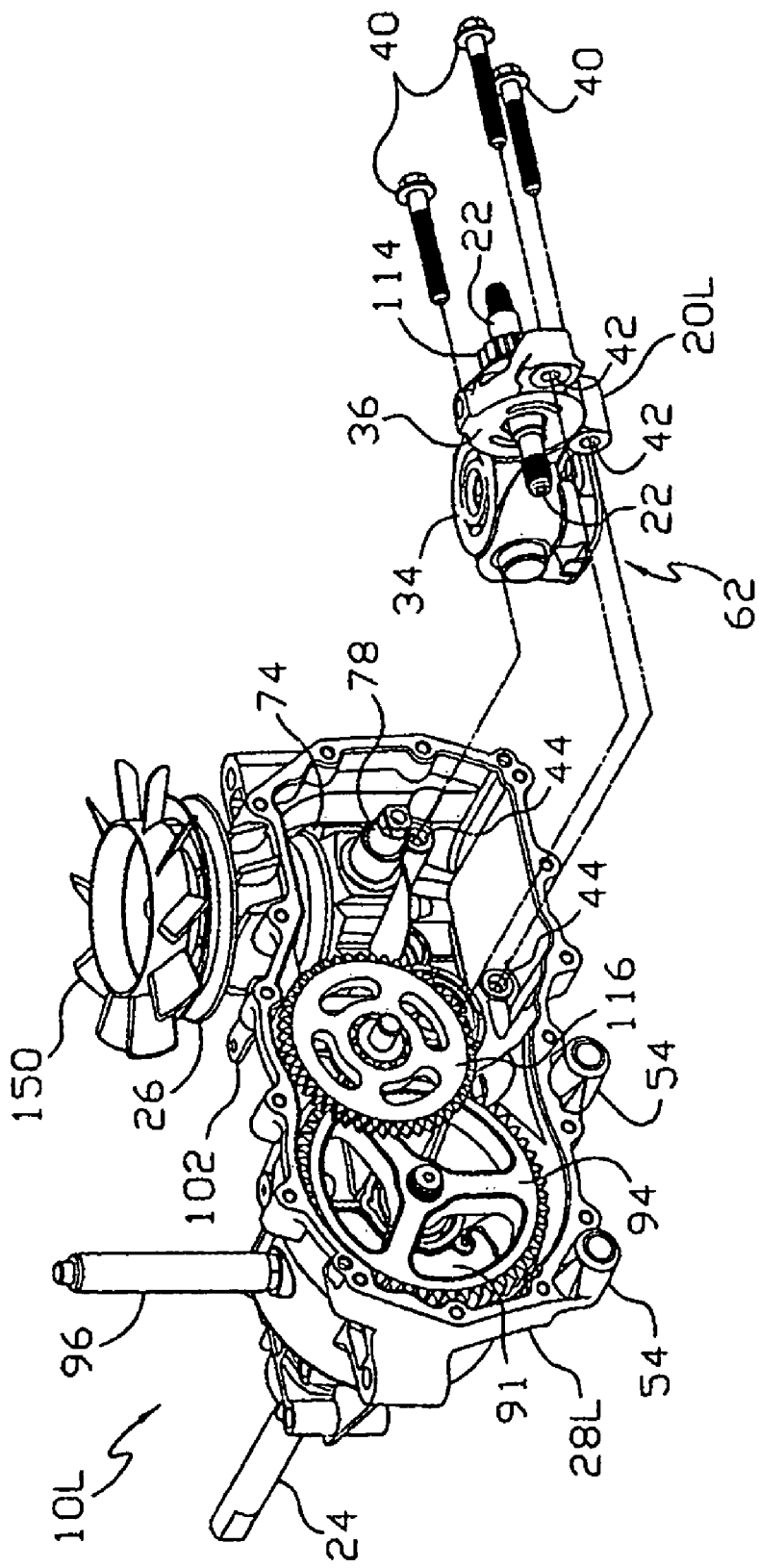
FIG. 17 illustrates an exploded view of the exemplary, zero-turn, hydrostatic transaxle of FIG. 12 particularly illustrating an exemplary center section, filter mechanism, and attachment hardware.
Figure 23:
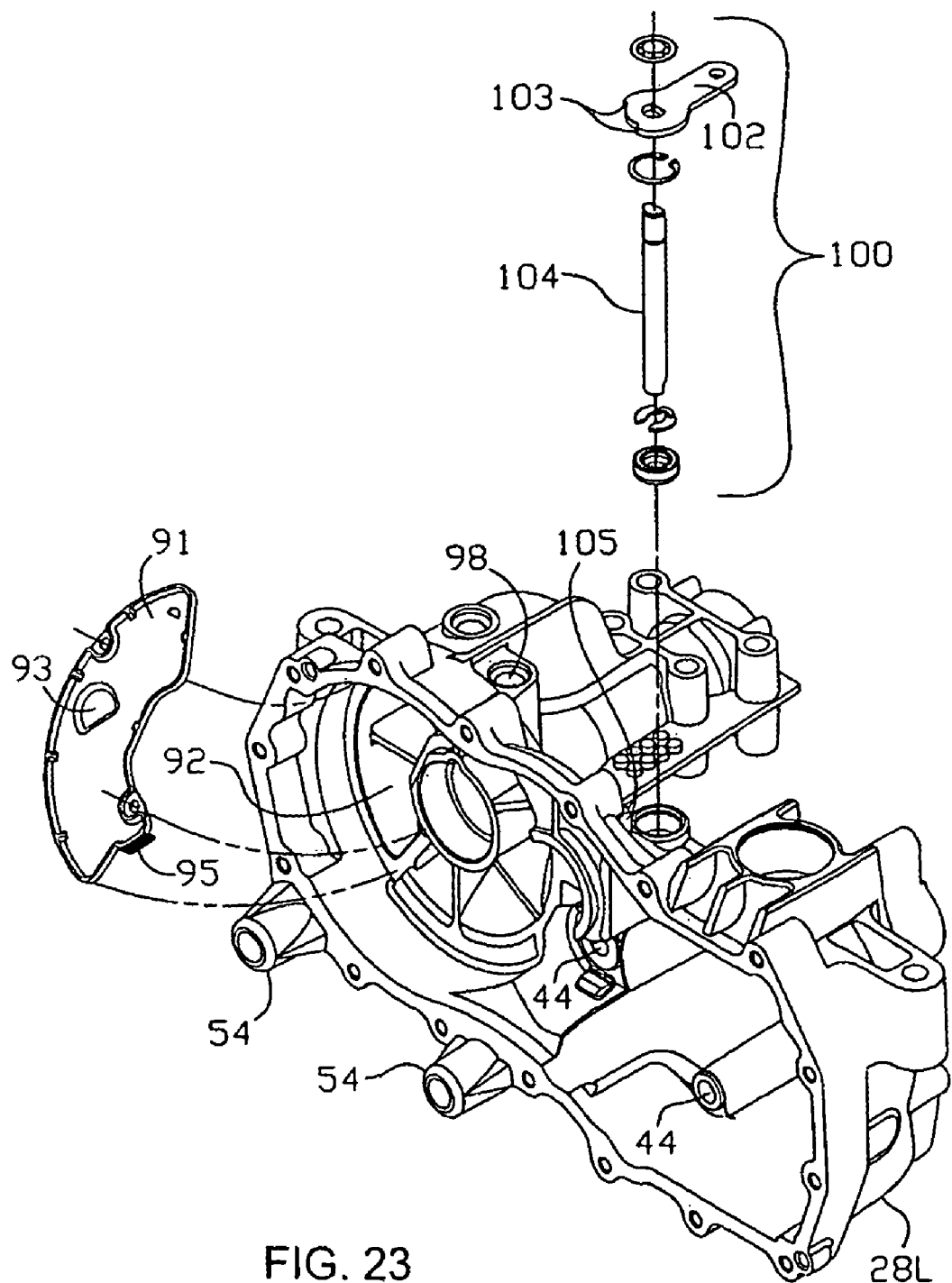
FIG. 23 illustrates an exploded view of an exemplary bypass mechanism and internal expansion tank cover for use in connection with the integrated, zero-turn, hydrostatic transaxle of FIG. 1.

To provide a space for hydraulic fluid to expand into during operation of HZT 10, each HZT 10 may include an internally located expansion tank 92 as illustrated in FIGS. 16, 17 and 23. In the illustrated embodiment, expansion tank 92 is positioned within the HZT casing adjacent to a bull gear 94 that is used to drive axle shaft 24. Venting of expansion tank 92 to atmosphere is accomplished via a breather tube 96 that extends from a top of the casing of HZT 10. Such an expansion tank may be seen in U.S. patent application Ser. No. 10/062,734, which is incorporated herein by reference in its entirety. Fluid may be added to HZT 10 by means of an oil fill port 98 that is also formed on the top of the casing of HZT 10. Further, expansion tank cover 91 may be provided with an indentation 93 and a thumb stop 95 (that extends below the sealing surface) by which expansion tank cover 91 may be grasped for insertion into first casing section 28. Indentation 93 is particularly sized to accept a finger of the installer. In this manner, expansion tank cover 91 may be installed while allowing the user to avoid contacting sealant carried on the sealing surface of cover 91.

To enable the vehicle on which HZTs 10 are mounted to roll or "freewheel" without resistance from the hydraulic fluid, each HZT 10 may include a hydraulic bypass. Generally, when an HZT 10 does not have a motive force being applied to it, hydraulic pump 14 and hydraulic motor 18 are not being rotated. Therefore, any attempt to roll the vehicle would transmit rotational energy through axle shaft 24 to motor shaft 22, via any internal gearing, thereby causing hydraulic motor 18 to rotate. The rotation of hydraulic motor 18, and the action of motor pistons 19 against motor thrust bearing 76, causes fluid to flow through hydraulic porting P of center section 20 to hydraulic pump 14. However, with hydraulic pump 14 being in neutral, the resultant pressure causes resistance to motion of motor shaft 22 and axle shaft 24 and prevents the user from easily pushing the vehicle.

To solve this problem, a bypass mechanism 100 may be associated with the hydraulic circuit to allow fluid to flow between the high pressure side and the low pressure side of center section 20 porting. Bypass mechanism 100, illustrated in FIG. 23, may be activated via rotation of a bypass arm 102 that is located proximate to the top of the casing of HZT 10. Bypass arm 102 is linked to a bypass actuator 104 that, in turn, interfaces with center section 20 at its distal end. The degree of movement of bypass arm 102 may be controlled by providing control arm 102 with a notch 103 the shoulders of which are adapted to engage a stop 105 formed on the casing to limit how far bypass arm 102 may be rotated.

To drive axle shaft 24, gearing may be provided that functions to drivingly couple axle shaft 24 to motor shaft 22. By way of example, with reference to FIGS. 16 and 17, motor shaft 22 may include a drive gear 114 that drivingly engages one or more reduction gears 116 that drive bull gear 94 which, in turn, drivingly engages axle shaft 24. In the illustrative embodiment, two reduction gears 116a and 116b are provided wherein first reduction gear 116a engages drive gear 114 and drives second reduction gear 116b that is set within the inside diameter of first reduction gear 116a. Second reduction gear 116b drives bull gear 94.

Figure 22:
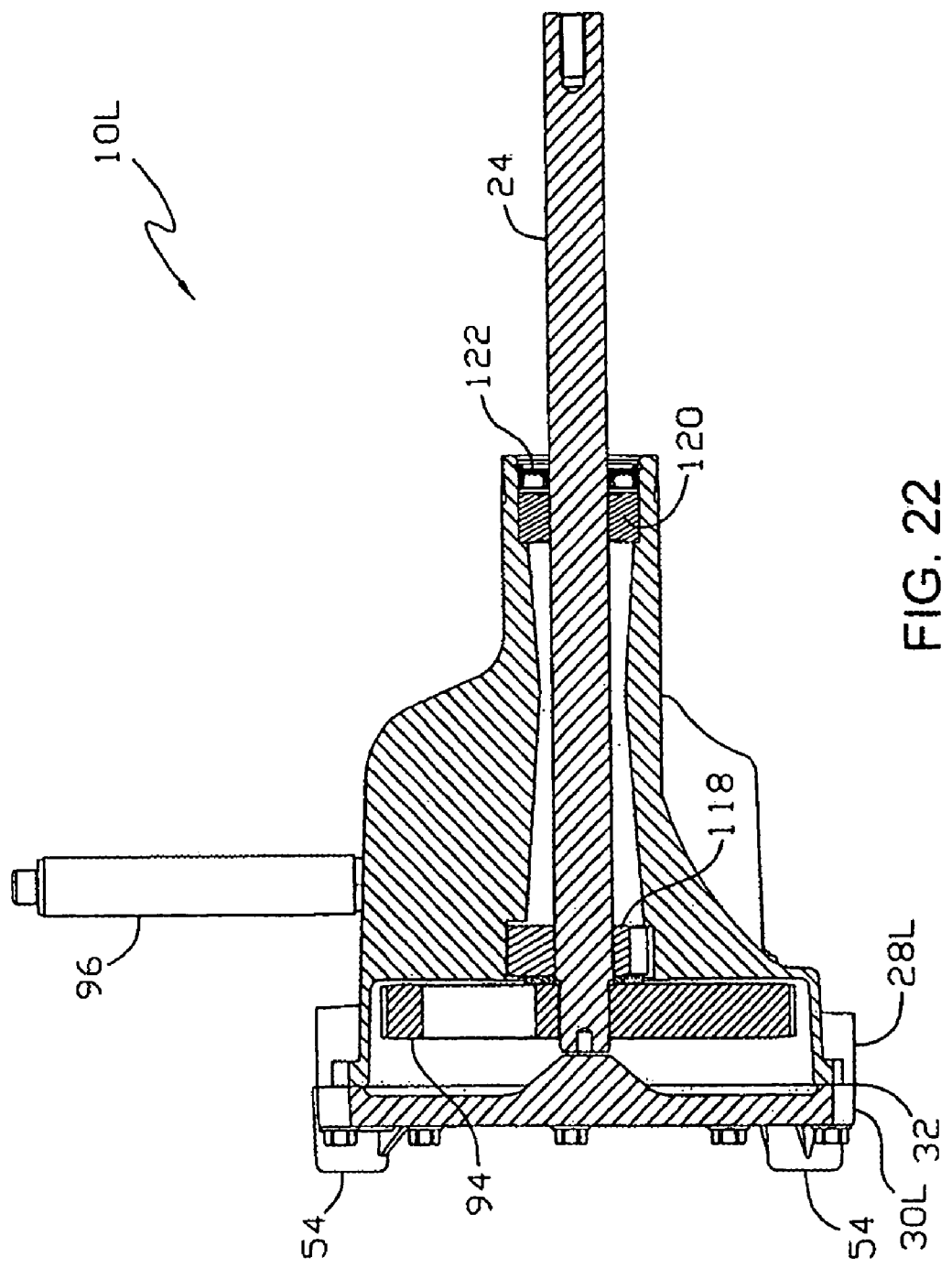
FIG. 22 illustrates a cross-sectional view of the exemplary, zero-turn, hydrostatic transaxle along line D—D of FIG. 13.

As further illustrated in FIG. 22, a proximal end of axle shaft 24 is carried by an inboard bushing 118 positioned within first casing section 28 adjacent to bull gear 94. Axial movement of axle shaft 24 in an inward direction towards bull gear 94 is prevented since the proximal end of axle shaft 24 is restrained by contacting an interior wall of first casing section 28. Axial movement of axle shaft 24 in an outward direction may be prevented through the use of a retaining ring positioned adjacent to the inward side of bull gear 94. First casing section 28 also includes an axle horn in which is carried an outboard bushing 120 that provides additional support for axle shaft 24. A seal and retaining ring pack 122 is positioned in the axle horn on the outboard side of bushing 120. It is to be understood that the distal end of axle shaft 24 is adapted to have a vehicle wheel mounted thereto.

Figure 10:
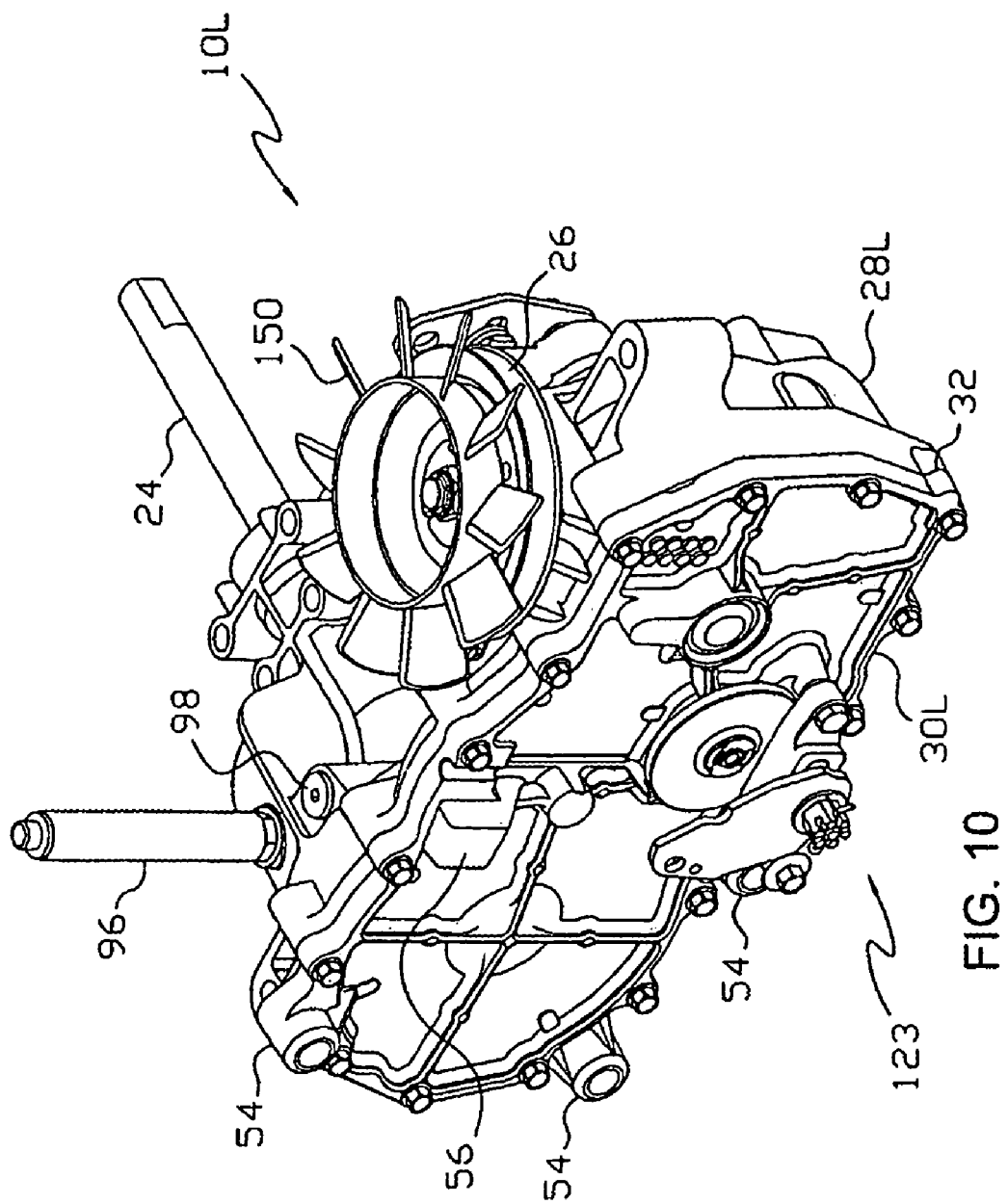
FIG. 10 illustrates a perspective view of an exemplary, zero-turn, hydrostatic transaxle used to form the integrated zero-turn, hydrostatic transaxle of FIG. 1 further illustrating an exemplary, inboard, disk brake mechanism and outboard control arm mechanism.
Figure 11:
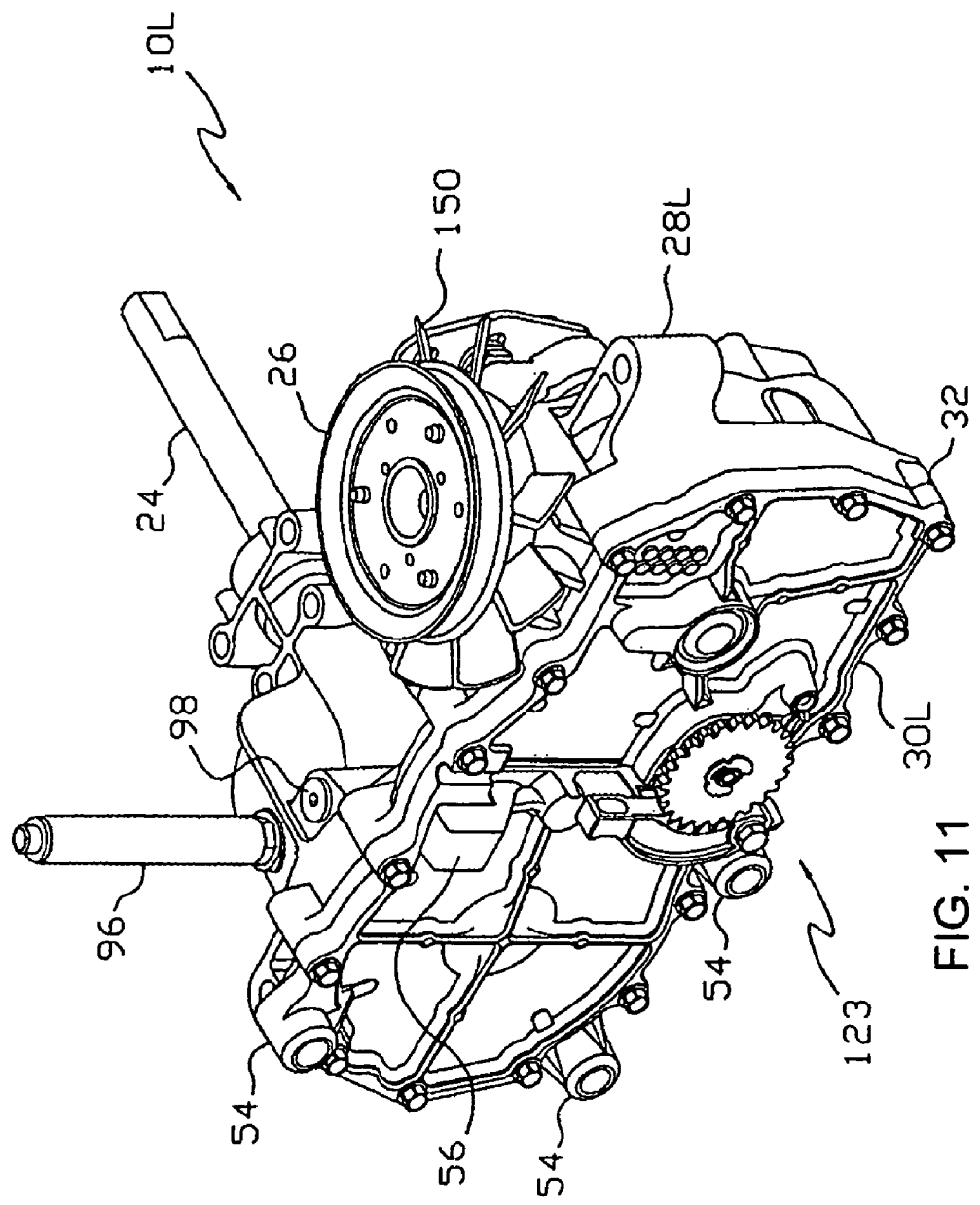
FIG. 11 illustrates a perspective view of the exemplary zero-turn, hydrostatic transaxle of FIG. 10 further illustrating an exemplary, inboard, cog brake mechanism and outboard control arm mechanism.
Figure 12:
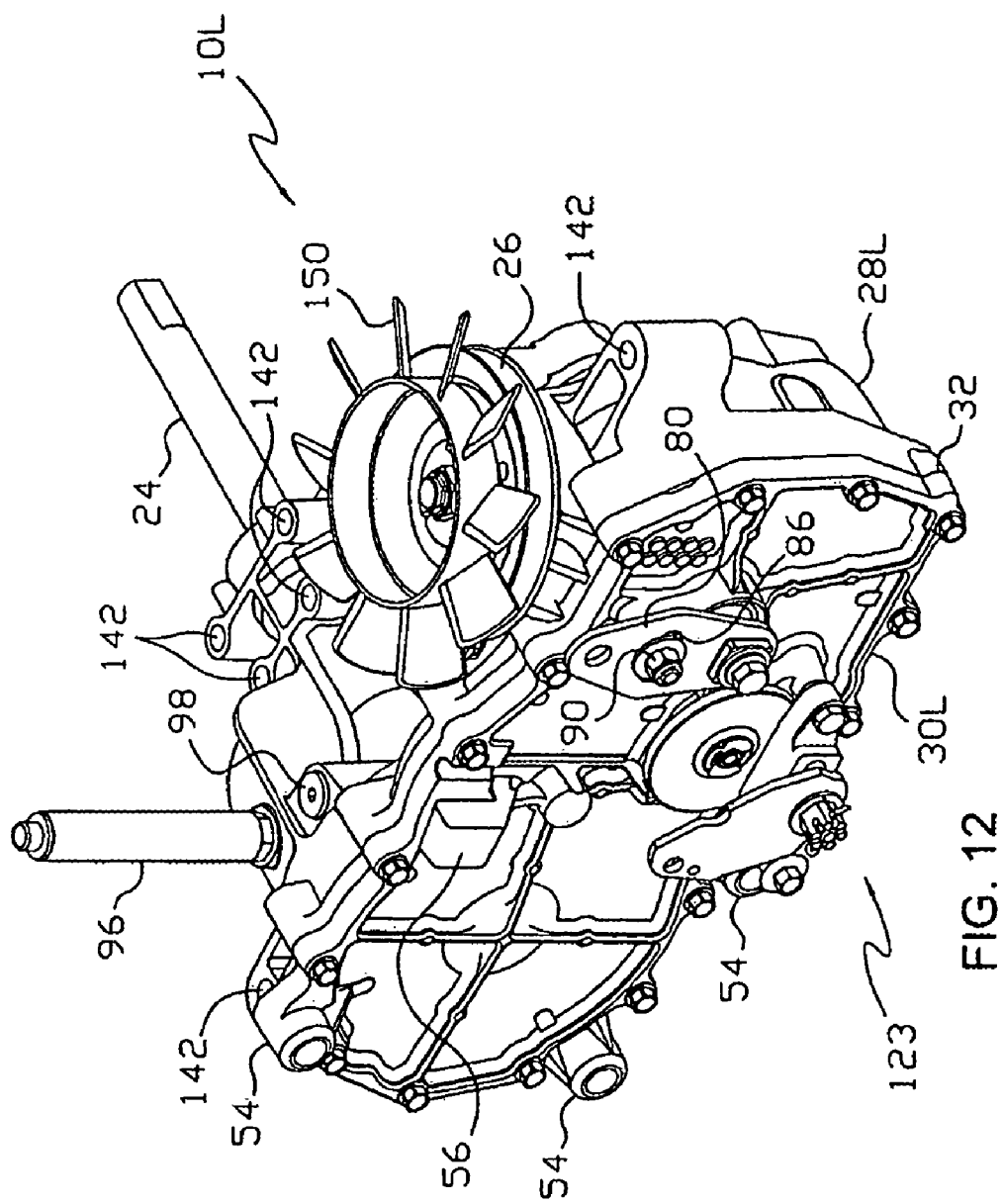
FIG. 12 illustrates a perspective view of the exemplary, zero-turn, hydrostatic transaxle of FIG. 10 further illustrating an exemplary, inboard, disk brake mechanism and inboard control arm mechanism.
Figure 13:
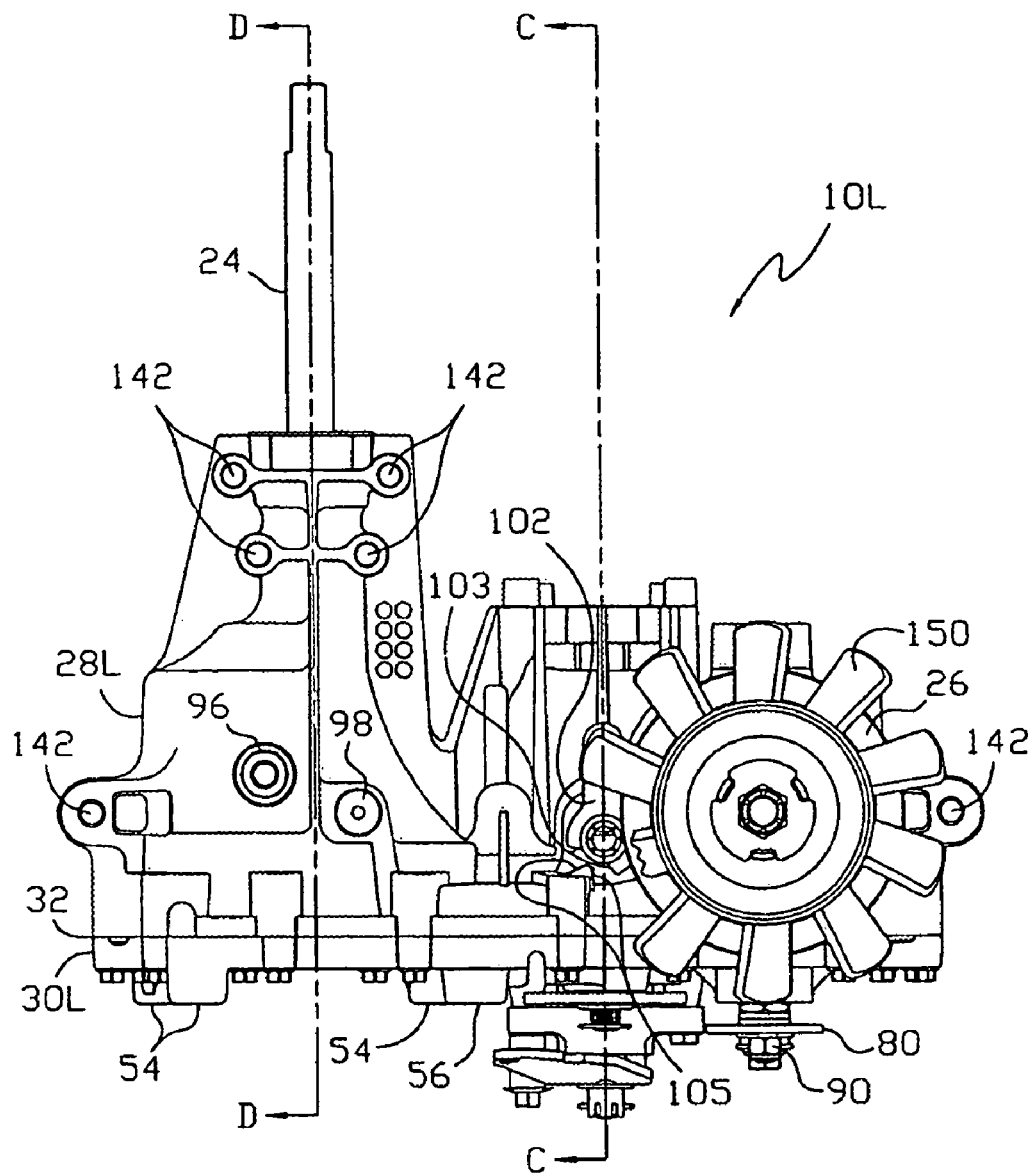
FIG. 13 illustrates a top view of the exemplary, zero-turn, hydrostatic transaxle of FIG. 12.
Figure 20:
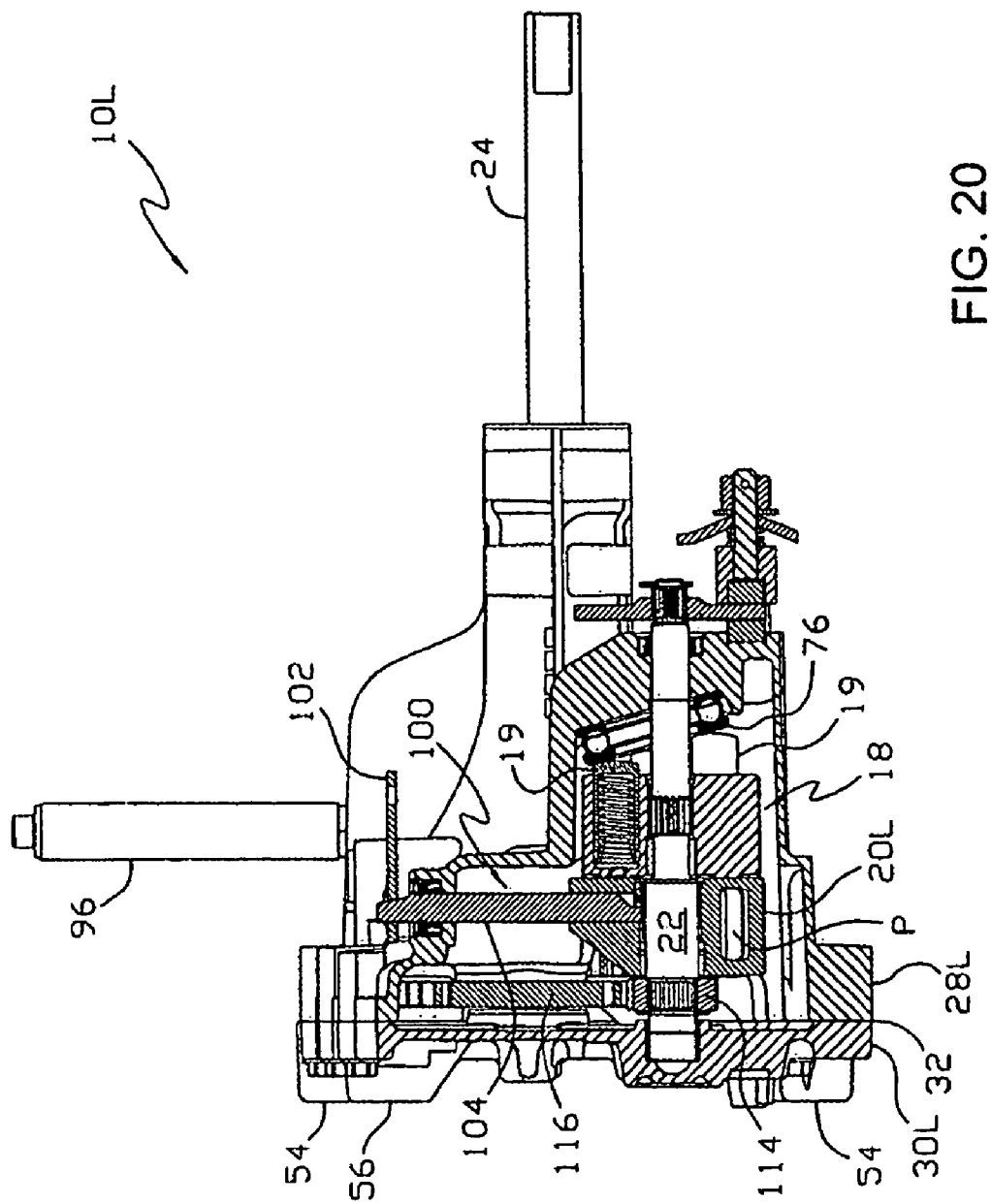
FIG. 20 illustrates a cross-sectional view of the exemplary, zero-turn, hydrostatic transaxle along line B—B of FIG. 15.
Figure 21:
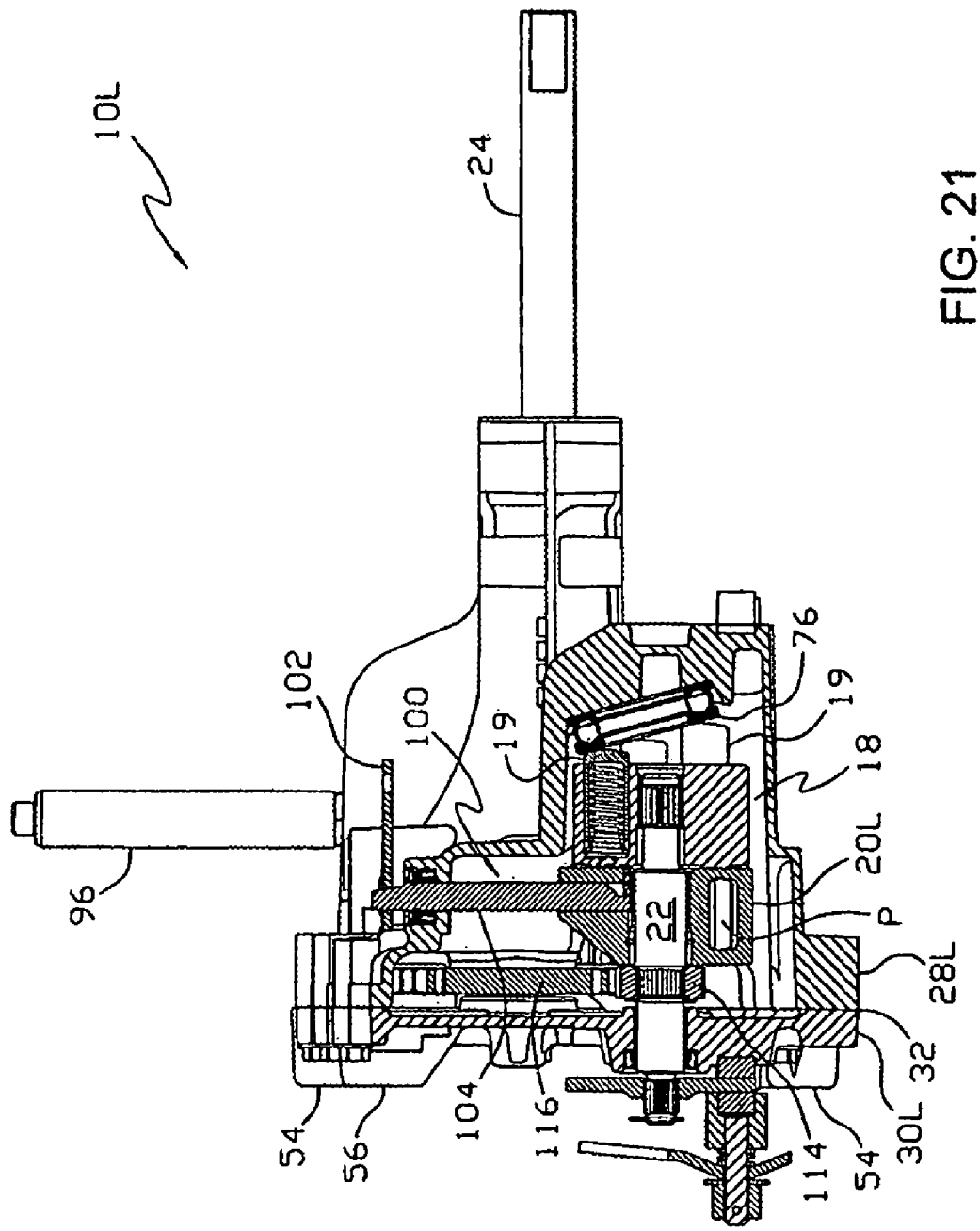
FIG. 21 illustrates a cross-sectional view of the exemplary, zero-turn, hydrostatic transaxle along line C—C of FIG. 13.

For allowing a brake mechanism 123 to be mounted to either the inboard or outboard side of the casing of HZT 10, motor shaft 22 can extend from the inboard side or the outboard side of first casing section 28, as seen in FIGS. 20 and 21. It will be appreciated that brake mechanism 123 may be a disc brake mechanism, as illustrated in FIG. 10, a cogged parking brake as illustrated in FIG. 11, or the like. As further illustrated in FIGS. 20 and 21, motor shaft 22 may be provided with a configuration that depends upon whether brake mechanism 123 is to be mounted on the inboard or outboard side of the casing. In this regard, three motor/brake shaft options are available. First, the motor/brake shaft could extend simultaneously from both the inboard and outboard side of the casing of HZT 10 (not shown). Second, as illustrated in FIG. 21, second casing section 30 can have an opening to accommodate motor shaft 22 for inboard mounting thereof and the motor/brake shaft would not extend through first casing section 28. Third, as illustrated in FIG. 20, second casing section 30 can be used to cover and support one end of motor/brake shaft 22 while the opposite end of the motor/brake shaft 22 extends from first casing section 28 to the outboard side of HZT 10. It will be appreciated that the first option increases the flexibility of HZT 10 while the second and third options provide for a lower cost motor/brake shaft while eliminating the need for extra machining and seals.

To provide for the easy mounting of HZT 10 to a vehicle frame, first casing section 28 of each HZT 10 includes a plurality of fastener accepting openings 142. As illustrated in FIGS. 12–15, a pair of fastener accepting openings 142 can be positioned on opposing sides of first casing section 28 and a further plurality of fastener accepting openings 142 can be positioned on the axle shaft horn of first casing section 28. While illustrated with four fastener accepting openings 142 being formed on the axle shaft horn of first casing section 28, it is to be appreciated that this is not intended to be limiting. Rather, any number of fastener accepting openings 142 can be formed and/or utilized in the attachment process. Still further, fastener accepting openings could be formed on a bracket 58 for use in mounting HZTs 10L and 10R to a vehicle frame.

For use in cooling the HZTs 10L and 10R, a fan 150 may be mounted to one or both input shafts 12 adjacent to pulley 26 as is illustrated in FIGS. 1 and 3. When two fans 150 are utilized, the diameters of fans 150 need to be such that they do not contact each other while turning. Alternatively, if fans 150 do have overlapping diameters, fans 150 need to be vertically spaced to prevent blade contact.

For controlling the movement of a vehicle 198 incorporating a zero-turn hydrostatic transaxle in a lateral direction, an electronic steering control system 200 may be provided, which includes a steering mechanism 202 that enables a vehicle operator to indicate the direction in which they desire the vehicle to move. As shown in FIGS. 29–32, steering mechanism 202 may be a standard circular steering wheel; however, it should be understood that the shape of the steering wheel is not important as long as the functionality provided by the steering wheel is maintained. Steering mechanism 202 is also connected to steering column 204 and steering column 204 cooperates with a steering position detector 206. Steering position detector 206 senses the rotational position of steering column 204. A signal representing the rotational position of steering column 204 is then transmitted to a computer processor 222, which then determines whether the position of steering column 204 has changed, and in which direction the change has occurred. The rotational position of steering column 204 may be detected by using sensors 208 located within steering position detector 206 that are capable of determining the rotational position of steering column 204 with respect to a fixed point, such as hall sensors, variable resistors, etc. Therefore, after a vehicle operator rotates steering mechanism 202 in a particular direction, steering position detector 206 determines the rotational position of steering column 204 with respect to that fixed point.

Figure 31:
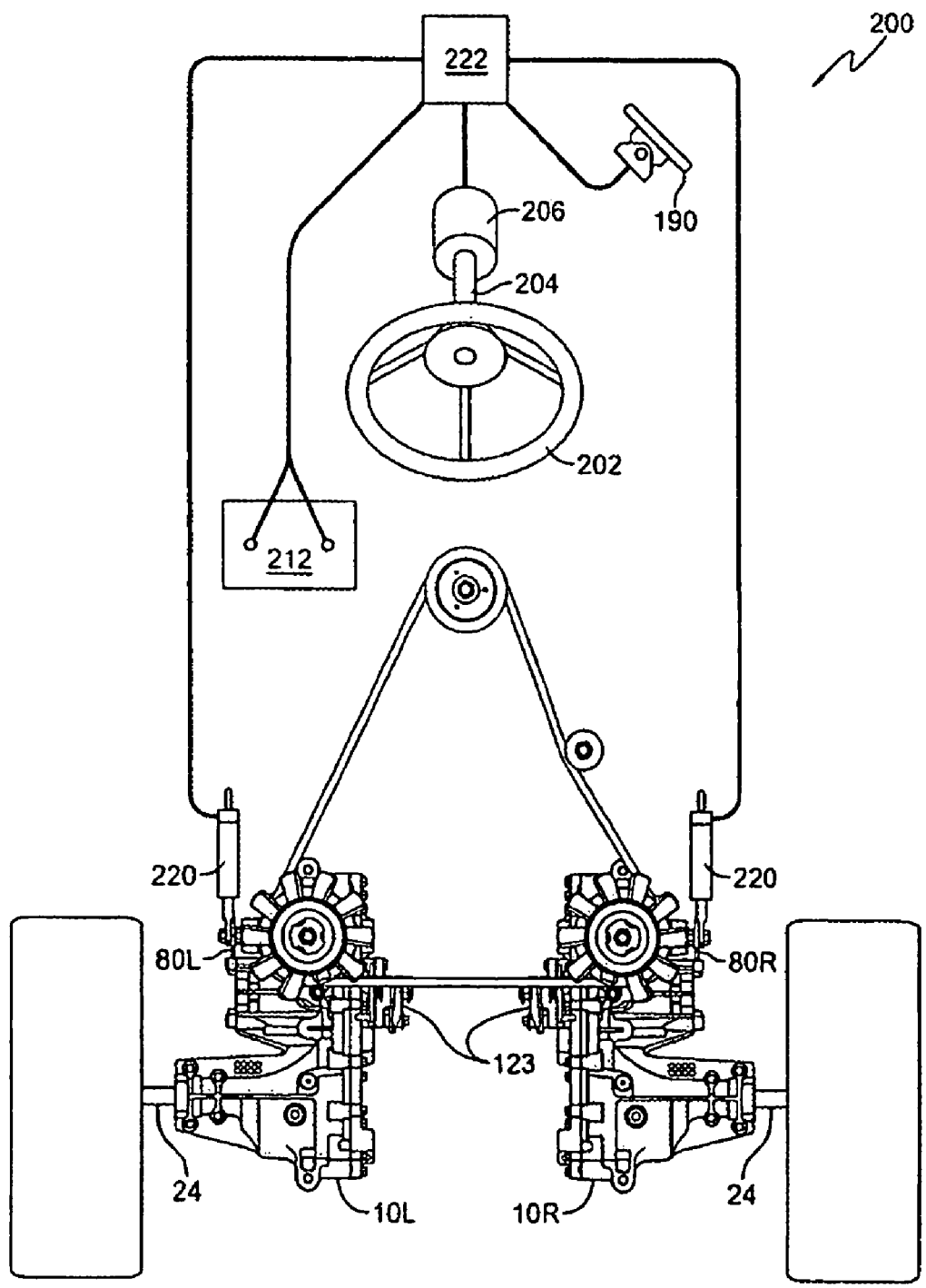
FIG. 31 depicts a mechanical schematic of an exemplary embodiment of the electronic steering control system shown in FIG. 29 in communication with a right and left zero-turn hydrostatic transaxle of a second transaxle embodiment.
Figure 32:
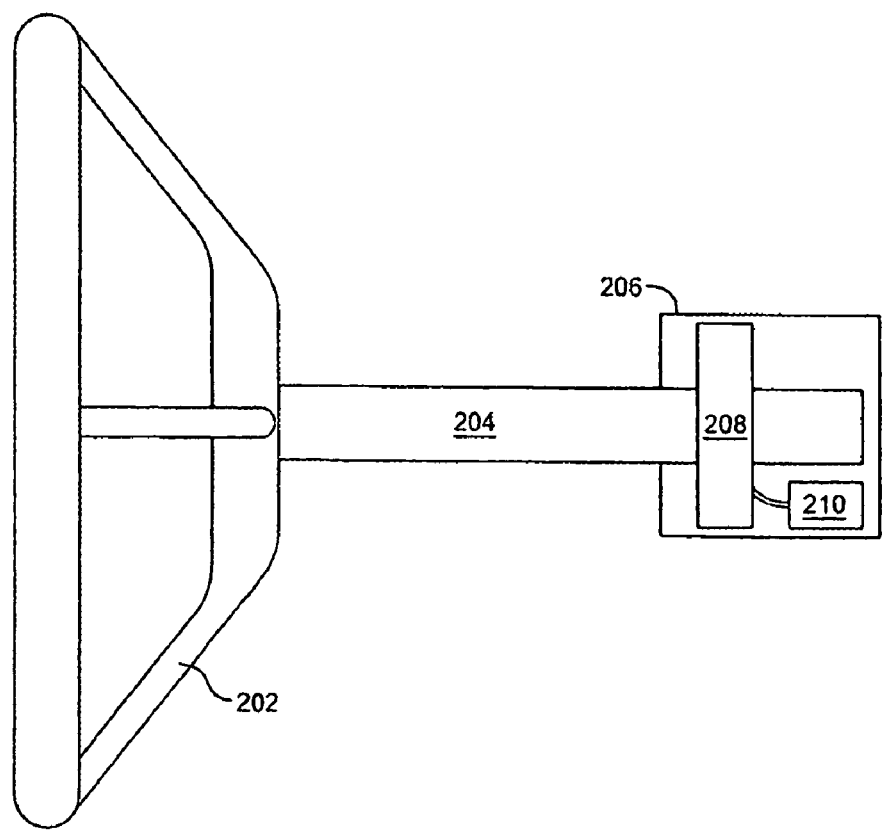
FIG. 32 depicts a second embodiment of the steering position indicator.

As previously noted, to ensure that vehicle 198 is steered in the proper direction, sensors 208 may send a signal to a computer processor 222, the signal being representative of the rotational position of the steering mechanism. As shown in FIG. 31, computer processor 222 may be electrically connected to steering position detector 206 and sensors 208. However, if computer processor 222 is not located proximate to and electrically connected to steering mechanism 202, sensors 208 may be connected to transmitter 210, shown in FIG. 32, which would transmit the signals provided by sensors 208 to computer processor 222. Therefore, it should be appreciated that computer processor 222 may be located in various positions on vehicle 198.

Other elements are shown in FIGS. 29–32 that are generally necessary for functioning of vehicle 198 and electronic steering control system 200, as would be understood by a person of ordinary skill in the art. A battery 212 would generally be required for powering various vehicle systems, including electronic steering control system 200. Other elements such as ignition switch 214 and operator speed control 190 would also be required.

Figure 29:
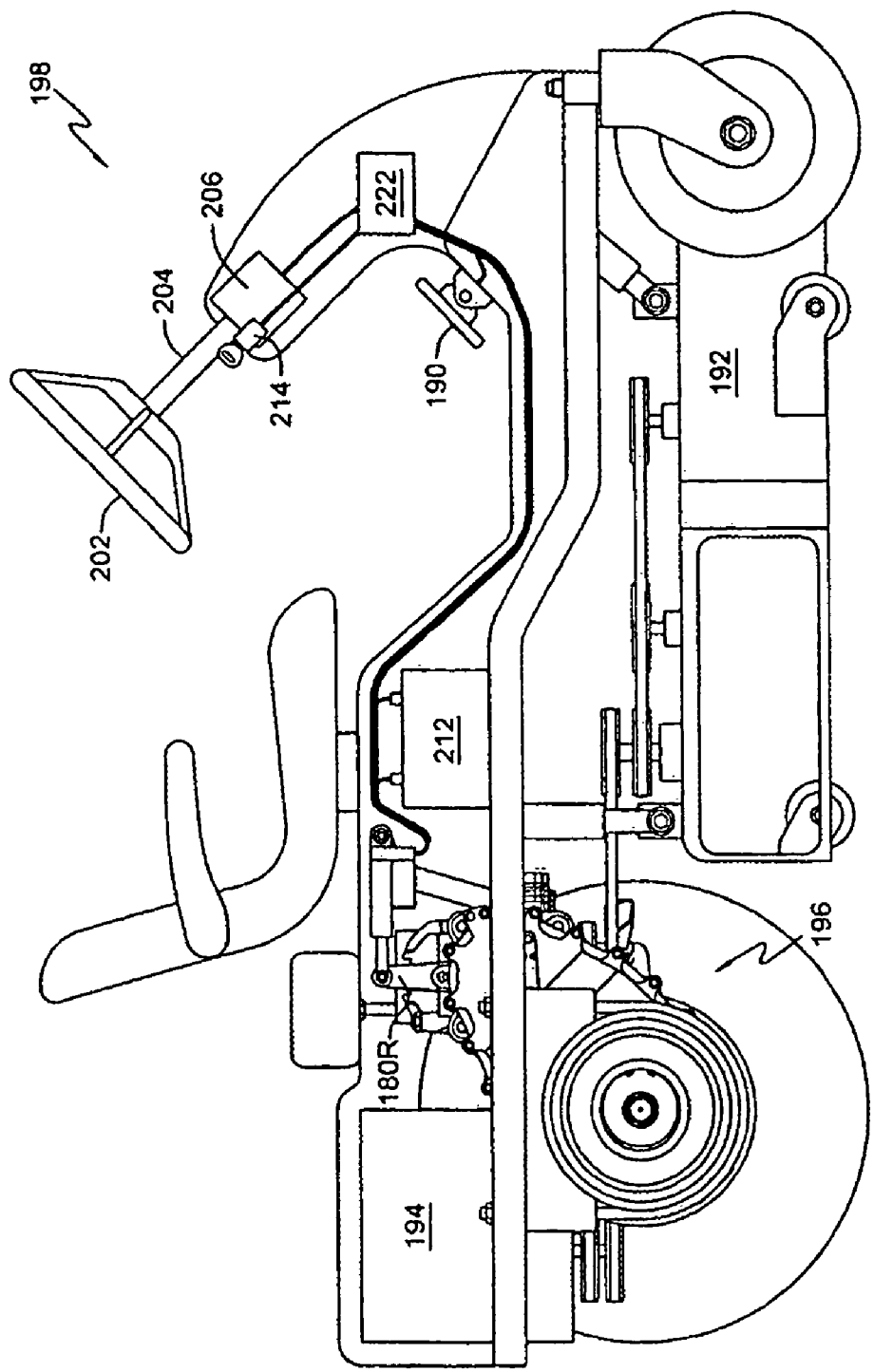
FIG. 29 illustrates a side view of a vehicle incorporating an electronic steering control system in association with a first transaxle embodiment.
Figure 30:
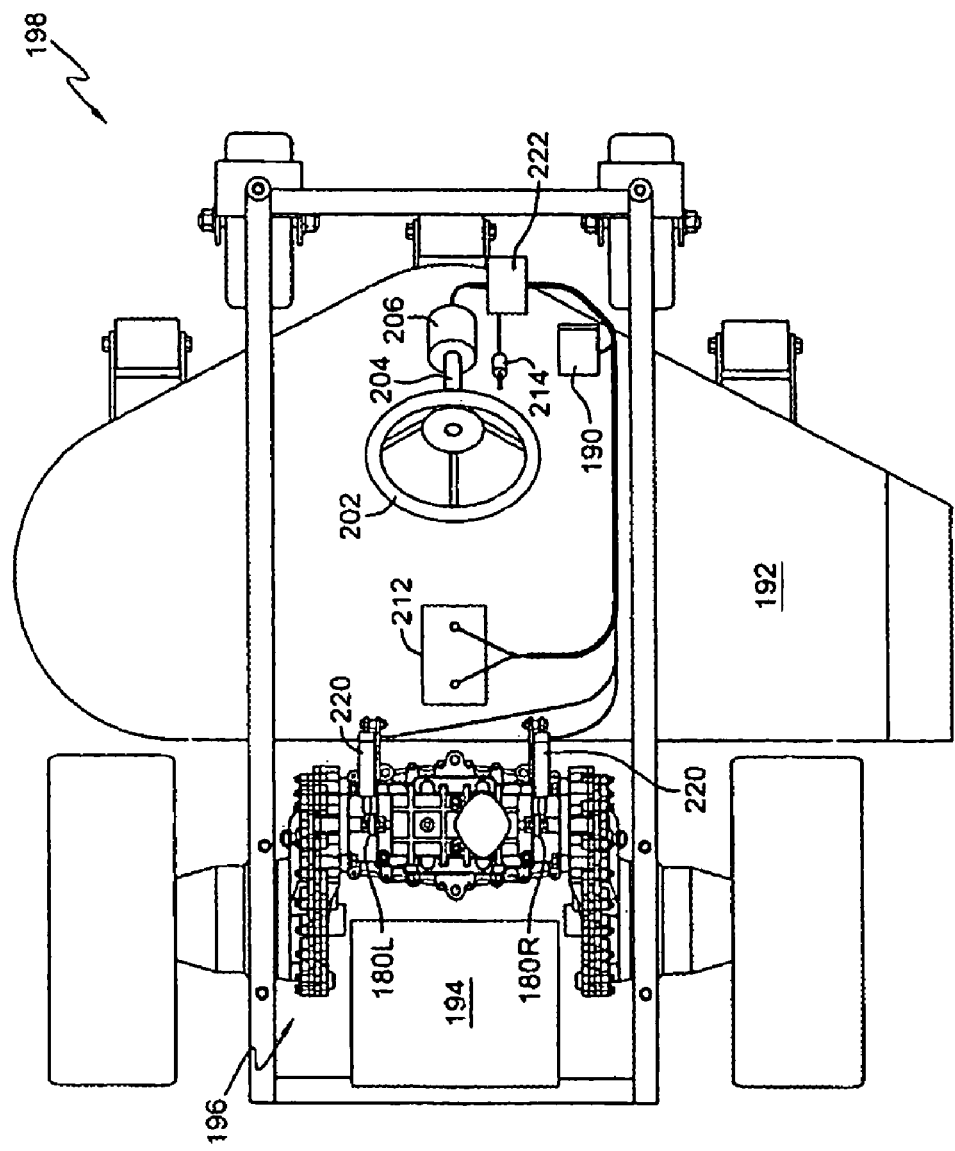
FIG. 30 depicts a plan view of the vehicle embodiment shown in FIG. 29 with certain elements removed for clarity.

FIGS. 29–31 also depict two transaxle configuration embodiments. In the first embodiment shown in FIGS. 29 and 30, HZT 196 is of a unitary design wherein all elements are contiguous and may share oil. In the second embodiment shown in FIG. 31, HZTs 10R and 10L are separate units that may be individually mounted in a vehicle or attached to each other and then mounted in a vehicle. Electronic steering control system 200 is amenable to a variety of transaxle configurations wherein there are two independently drivable transaxles.

Figure 33:
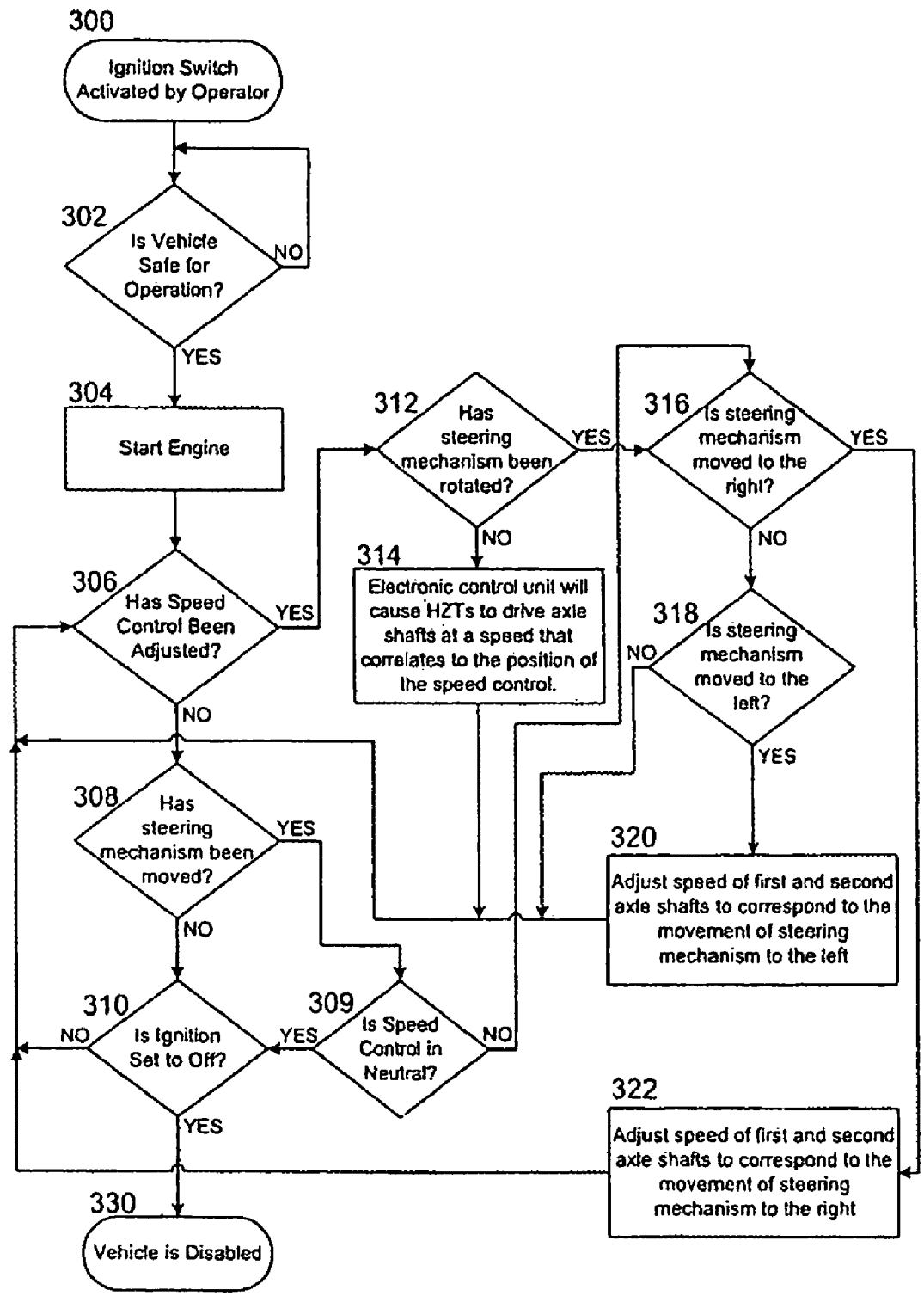
FIG. 33 illustrates a flow chart with an exemplary series of steps that might be utilized in connection with the operation of the electronic steering control system shown in FIGS. 29–32.

FIG. 33 depicts a flowchart exemplifying the operation of the electronic steering control system described above. For example, if ignition switch 214 is activated by a vehicle operator (step 300), vehicle 198 may first determine whether the vehicle is safe for operation (step 302). Step 302 may include testing to see if control arms 80L and 80R, or control arms 180L and 180R, and swash plates 74L and 74R are in the neutral position, brake mechanism 123 is engaged, the vehicle operator is seated on the vehicle or the mower 192 is turned off.

Once it is determined that vehicle 198 is safe for operation, vehicle engine 194 will be started (step 304). Then electronic steering control system 200 will determine if speed control 190 has been adjusted (step 306). The speed of vehicle 198 will be directly proportional to the position of speed control 190, which cooperates with swash plate 74 to control the speed of vehicle 198. If speed control 190 has been adjusted, electronic control system 200 will then determine whether steering mechanism 202 has been rotated (step 312). If speed control 190 has been moved and steering mechanism 202 has not been rotated, an electronic control unit 220 will cause HZT 10L and 10R to drive axle shaft 24 at a speed that correlates to the position of speed control 190 (step 314). If speed control 190 has not been adjusted, electronic steering adjustment system 200 will determine whether steering mechanism 202 has been rotated (step 308). If speed control 190 has not been adjusted and steering mechanism 202 has been adjusted, electronic steering adjustment system 200 will determine if speed control 190 is in neutral (step 309). If speed control 190 is in neutral, step 310 and the steps that follow it will be executed. If speed control 190 is not in neutral, step 316 and the steps that follow it will be employed.

If steering mechanism 202 is rotated, electronic steering control system 200 will determine whether steering mechanism 202 was rotated to the right (step 316). If steering mechanism 202 was rotated to the right, computer processor 222 will determine the speed at which the vehicle is set and the degree to which steering mechanism 202 has been rotated. Based on these factors and in response to steering mechanism 202 being rotated to the right, the computer processor 222 sends a signal to actuators 220 to adjust the speed of axle shaft 24 for each HZT 10L and 10R wherein the speed of axle shaft 24 of HZT 10R will have a lower speed than axle shaft 24 of HZT 10L, which causes vehicle 198 to be steered to the right (step 322).

If steering mechanism 202 was not rotated to the right, the electronic steering control system 200 will determine if steering mechanism 202 was rotated to the left (step 318). If steering mechanism 202 is rotated to the left, computer processor 222 will determine the speed at which the vehicle is set and the degree in which steering mechanism 202 has been rotated. Based on these factors and in response to steering mechanism 202 being rotated to the left, computer processor 222 will send a signal to actuators 220 to adjust the speed for axle shaft 24 for each HZT 10L and 10R, wherein the speed of axle shaft 24 of HZT 10L will have a lower speed than axle shaft 24 of HZT 10R, which causes vehicle 198 to steer to the left (step 320).

If speed control 190 has not been adjusted and steering mechanism 202 has not been rotated, electronic steering control system 200 will determine whether vehicle ignition 214 has been disabled (step 310). If vehicle ignition 214 has not been disabled, vehicle 198 will repeat the steps described above of determining whether speed control 190 has been moved or steering mechanism 202 has been rotated, beginning with step 306. If vehicle ignition 214 has been disabled, engine 194 will be disabled (step 330).

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A hydrostatic drive apparatus for driving a vehicle, comprising:
   a first hydrostatic transaxle having a first casing in which is carried a first hydraulic pump driven by a first input shaft and a first hydraulic motor having a first motor shaft drivingly linked to a first axle shaft, the first hydraulic pump being in fluid communication with the first hydraulic motor to transfer a motive force received via the first input shaft to the first hydraulic motor and the first motor shaft to drive the first axle shaft; and
   a second hydrostatic transaxle having a second casing that is attached to the first casing, the second casing carrying a second hydraulic pump driven by a second input shaft and a second hydraulic motor having a second motor shaft drivingly linked to a second axle shaft, the second hydraulic pump being in fluid communication with the second hydraulic motor to transfer a motive force received via the second input shaft to the second hydraulic motor and the second hydraulic motor shaft to drive the second axle shaft, wherein the first motor shaft extends from the first casing towards the second casing, the second motor shaft extends from the second casing towards the first casing; and
   an electronic steering control system located on the vehicle and operatively engaged to both the first and second transaxles, whereby operation of the electronic steering control system controls the output of both transaxles.

2. The hydrostatic drive apparatus of claim 1, wherein the electronic steering control system further comprises a steering mechanism for controlling the lateral direction in which the vehicle moves.

3. The hydrostatic drive apparatus of claim 2, wherein the steering mechanism is a steering wheel.

4. The hydrostatic drive apparatus of claim 1, further comprising a first brake mechanism engaged to the first motor shaft and a second brake mechanism engaged to the second motor shaft.

5. The hydrostatic drive apparatus of claim 1, wherein the electronic steering control system is powered by the vehicle battery.

6. A drive apparatus for driving a vehicle, comprising:
   a first zero-turn hydrostatic transaxle and a second, zero-turn hydrostatic transaxle, wherein the first zero-turn hydrostatic transaxle is a substantial mirror image of the second zero-turn hydrostatic transaxle and the first and second zero-turn hydrostatic transaxles are adapted to be fastened to one another and each hydrostatic transaxle has a casing in which is carried a hydraulic pump driven by an input shaft and a hydraulic motor having a motor shaft drivingly linked to an axle shaft, the hydraulic pump being in fluid communication with the hydraulic motor to transfer a motive force received via the input shaft to the hydraulic motor and the motor shaft to drive the axle shaft; and
   an electronic steering control system located on the vehicle and operatively engaged to both the first and second hydrostatic transaxles, whereby operation of the electronic steering control system controls the output of both hydrostatic transaxles.

7. The drive apparatus of claim 6, wherein each of the first zero-turn, hydrostatic transaxle and the second zero-turn, hydrostatic transaxle further comprise a swash plate mounted on a trunnion arm for controlling the amount of fluid that is forced from the hydraulic pump to the hydraulic motor and wherein each casing is adapted to allow a control arm used to rotate the trunnion arm to be mounted to either the inboard or outboard side of the casing.

8. The drive apparatus of claim 7, wherein the electronic steering control system further comprises a steering mechanism for controlling the lateral direction in which the vehicle moves.

9. The drive apparatus of claim 8, wherein the steering mechanism is a steering wheel.

10. An integrated, zero-turn, hydrostatic transaxle for driving a vehicle comprising:
    a first casing section having a first cavity in which is disposed a first hydraulic pump driven by a first input shaft and a first hydraulic motor drivingly linked to a first axle shaft, the first hydraulic pump being in fluid communication with the first hydraulic motor to transfer a motive force received via the first input shaft to the first hydraulic motor to drive the first axle shaft;
    a second casing section having a second cavity in which is disposed a second hydraulic pump driven by a second input shaft and a second hydraulic motor drivingly linked to a second axle shaft, the second hydraulic pump being in fluid communication with the second hydraulic motor to transfer a motive force received via the second input shaft to the second hydraulic motor to drive the second axle shaft;
    a third casing section adapted to substantially cover the first cavity and the second cavity when the first casing section is joined with the second casing section; and
    an electronic steering control system located on the vehicle and operatively engaged to the transaxle, whereby operation of the electronic steering control system controls the output of both hydraulic pumps.

11. The integrated, zero-turn hydrostatic transaxle of claim 10, wherein the electronic steering control system further comprises a steering mechanism for controlling the lateral direction in which the vehicle moves.

12. The integrated, zero-turn hydrostatic transaxle of claim 11, wherein the steering mechanism is a steering wheel.

13. The integrated, zero-turn, hydrostatic transaxle of claim 10 wherein fasteners used to attach the first casing section to the second casing section pass through openings in the third casing section.

14. The integrated, zero-turn, hydrostatic transaxle of claim 13, wherein fluid may pass between the first cavity and the second cavity via one or more openings in the third casing section.

15. A steering system for a pair of hydrostatic devices for driving a vehicle, wherein each hydrostatic device includes a swash plate for controlling the output of the hydrostatic device and a control member engaged to the swash plate to control the position of the swash plate, the steering system comprising:

a pair of electrically powered actuators, each actuator engaged to and configured to move one of the control members;

a steering wheel mounted on the vehicle; and an electronic control system for translating the position of the steering wheel into signals to position each electrically powered actuator such that the vehicle is steered.

16. The steering system of claim 15, wherein steering is accomplished by positioning each actuator such that one hydrostatic device is driving at a speed less than the other hydrostatic device.

17. The steering system of claim 15, further comprising a speed control wherein the electronic control system adjusts the position of the actuators to correspond with the position of the speed control.

18. The steering system of claim 17, wherein the electronic control system prohibits movement of both electrically powered actuators when the speed control is in neutral.

19. The steering system of claim 15, wherein one actuator is electronically positioned to reduce the speed of one hydrostatic device with respect to the other hydrostatic device.

20. The steering system of claim 15, wherein steering is accomplished by positioning each actuator such that the speed of one hydrostatic device is decreased and the speed of the other hydrostatic device is increased.

21. The steering system of claim 15, wherein the position of the steering wheel is detected by a hall sensor.

22. The steering system of claim 21, wherein the electronic control system monitors the output of the hall sensor to determine whether the steering wheel has changed position.

23. The steering system of claim 15, wherein each control member comprises a trunnion engaged to the swash plate.

* * * * *